US010704496B2

(12) United States Patent
Lee

(10) Patent No.: US 10,704,496 B2
(45) Date of Patent: Jul. 7, 2020

(54) FLIGHT CONTROL MECHANISMS AND METHODS OF OPERATING AIRCRAFT WITH FLIGHT CONTROL MECHANISMS

(71) Applicant: The Boeing Company, Chicago, IL (US)

(72) Inventor: Robert Michael Lee, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 359 days.

(21) Appl. No.: 15/601,540

(22) Filed: May 22, 2017

(65) Prior Publication Data

US 2018/0334246 A1    Nov. 22, 2018

(51) Int. Cl.
*F02K 1/00* (2006.01)
*F02K 1/76* (2006.01)
(Continued)

(52) U.S. Cl.
CPC .................. *F02K 1/76* (2013.01); *B64C 9/00* (2013.01); *B64C 9/02* (2013.01); *B64C 9/06* (2013.01); *B64C 9/323* (2013.01); *B64C 9/38* (2013.01); *B64C 13/00* (2013.01); *B64C 13/16* (2013.01); *B64C 15/00* (2013.01); *B64C 15/14* (2013.01);
(Continued)

(58) Field of Classification Search
CPC .... B64C 9/02; B64C 9/16; B64C 9/32; B64C 9/323; B64C 9/38; B64C 13/16; B64C 15/14; B64C 21/025; B64C 21/04; B64C 21/08; B64C 2230/0406; F02K 1/00;
(Continued)

(56) References Cited

U.S. PATENT DOCUMENTS 2,431,449 A * 11/1947 Ashkenas ............... B64C 13/00
244/87
2,838,909 A * 6/1958 Meulien .................... F02K 1/58
239/265.23
(Continued)

FOREIGN PATENT DOCUMENTS

DE         2643391 B3 *   9/2009   ............ B64C 15/14

OTHER PUBLICATIONS

Translation of DE 2643391 B3 (Year: 2009).*
(Continued)

*Primary Examiner* — Richard R. Green
*Assistant Examiner* — Steven J Shur
(74) *Attorney, Agent, or Firm* — Kwan & Olynick LLP

(57) ABSTRACT

Provided are flight control mechanisms, such as omnidirectional thrust mechanisms (OTMs), and methods of using such mechanisms. These mechanisms may be positioned in wings, tails, or other components of aircraft. A mechanism may comprise a center member and top and bottom panels. The center member may comprise two curved segments joint at a center edge. The top and bottom panels may be independently pivotable relative to the center member. At high speeds, the top panel and/or the bottom panel may be pivoted outward to change the lift, drag, roll, and/or other flight conditions. The mechanism may also include a gas nozzle to direct compressed gas to the center member. The center member and/or the top and bottom panels redirect this gas resulting in forces in one of four directions, which are used for controlling the aircraft at low speeds, down to hover.

20 Claims, 10 Drawing Sheets

(51) Int. Cl.
  *B64D 33/04* (2006.01)
  *F02K 1/40* (2006.01)
  *B64C 15/00* (2006.01)
  *B64C 15/14* (2006.01)
  *B64C 9/00* (2006.01)
  *B64C 9/02* (2006.01)
  *B64C 9/06* (2006.01)
  *B64C 13/00* (2006.01)
  *B64C 13/16* (2006.01)
  *B64C 21/00* (2006.01)
  *B64C 21/02* (2006.01)
  *B64C 21/04* (2006.01)
  *B64C 21/08* (2006.01)
  *B64C 9/38* (2006.01)
  *B64C 9/32* (2006.01)

(52) U.S. Cl.
  CPC .............. *B64C 21/00* (2013.01); *B64C 21/02* (2013.01); *B64C 21/025* (2013.01); *B64C 21/04* (2013.01); *B64C 21/08* (2013.01); *B64D 33/04* (2013.01); *F02K 1/00* (2013.01); *F02K 1/002* (2013.01); *F02K 1/40* (2013.01); *B64C 2009/005* (2013.01); *B64C 2230/00* (2013.01); *B64C 2230/04* (2013.01); *B64C 2230/06* (2013.01); *F05D 2220/328* (2013.01); *F05D 2220/90* (2013.01)

(58) Field of Classification Search
  CPC ... F02K 1/002; F02K 1/76; F02K 1/40; B64D 33/04
  USPC ................................... 244/3.21, 3.22, 51, 52
  See application file for complete search history.

(56) References Cited

U.S. PATENT DOCUMENTS 3,040,523 A * 6/1962 Price .......................... F02K 1/06
  239/265.25
4,005,823 A * 2/1977 Thayer ...................... B64C 9/38
  239/265.37
5,690,280 A * 11/1997 Holowach ............... F02K 1/006
  239/265.19
2018/0334247 A1 11/2018 Lee

OTHER PUBLICATIONS

"Harrier Jump Jet", Retrieved from the Internet: https://en.wikipedia.org/wiki/Harrier_Jump_Jet; Accessed on Aug. 28, 2017, 11 pgs.
"VTOL", Wkipedia, Retrieved from the Internet: https://en.wikipedia.org/wiki/VTOL; Accessed on Aug. 28, 2017, 10 pgs.

* cited by examiner

FLIGHT CONTROL MECHANISMS AND METHODS OF OPERATING AIRCRAFT WITH FLIGHT CONTROL MECHANISMS

BACKGROUND

In general, fixed-wing aircraft generate forward thrust by pushing air in the direction opposite to flight. Various mechanisms, such as spinning blades of a propeller, a rotating fan pushing air out from the back of a jet engine, a rocket engine ejecting hot gases, may be used for this purpose. Some aircraft powered by jet engines are capable of vertical and/or short take-off and landing (V/STOL), which allows such aircraft to take-off or land vertically or on short runways. V/STOL capabilities are provided by vertically directing the thrust created, for example, by jet engines. Current solutions, such as the shutter valves on the AV-8 Harrier aircraft, can only provide force in two directions opposite from each other. More valves would be required if additional directions are desired. Furthermore, current solutions are useless or not effective at higher speeds (i.e. cost and weight addition with no benefit). Thus, there is a need for an apparatus, and corresponding systems and methods, that provide greater maneuverability of aircraft that are effective at both high and low speeds.

SUMMARY

The following presents a simplified summary of the disclosure in order to provide a basic understanding of certain embodiments of this disclosure. This summary is not an extensive overview of the disclosure, and it does not identify key and critical elements of the present disclosure or delineate the scope of the present disclosure. Its sole purpose is to present some concepts disclosed herein in a simplified form as a prelude to the more detailed description that is presented later.

Provided are flight control mechanisms, such as omnidirectional thrust mechanisms (OTMs), and methods of operating such mechanisms on an aircraft, such as a short takeoff and vertical landing (STOL) aircraft. In some examples, a flight control mechanism comprising a center member, a top panel, a bottom panel. The center member may comprise a top edge and a bottom edge. The top edge may extend toward the top panel, while the bottom edge may extend toward the bottom panel. The top panel is pivotable relative to the center member, for example, around a top pivot axis. The bottom panel is pivotable relative to the center member, for example, around a bottom pivot axis. In some embodiments, the top pivot axis is parallel to the bottom pivot axis. Alternatively, the top pivot axis may not be parallel to the bottom pivot axis.

In some embodiments, the flight control mechanism comprises a top actuator and a bottom actuator. The top actuator may be coupled to the top panel and operable to pivot the top panel, independently from the bottom panel. The bottom actuator may be coupled to the bottom panel and operable to pivot the bottom panel, independently from the top panel.

In some embodiments, the top panel is pivotable between 10° and 60° or, more specifically, between 25° and 56° in one direction (e.g., an outward direction, away from the bottom panel). The top panel may pivot in another direction (e.g., an inward direction, toward the bottom panel) until the top panel actually contacts or almost contacts the bottom panel when the bottom panel is in its bottom flush orientation, e.g., when the bottom panel is coplanar with a bottom wing surface of the aircraft. Likewise, the bottom panel is pivotable between 10° and 60° or, more specifically, between 25° and 56° in one direction (e.g., an outward direction, away from the top panel). The bottom panel may pivot in another direction (e.g., an inward direction, toward the top panel) until the bottom panel actually contacts or almost contacts the top panel when the top panel is in its top flush orientation, e.g., when the top panel is coplanar with a top wing surface of the aircraft.

In some embodiments, the center member further comprises a center edge. The center edge may extend parallel to at least one of the top edge or the bottom edge of the center member, even if the center edge and one or both of the top edge are the bottom edge and not straight lines (e.g., parallel curves). In some embodiments, at least one or more (or all) of the center edge, the top edge, or the bottom edge may be a straight line. The center edge may protrude past the plane extending through the top edge and the bottom edge of the center member. In some embodiments, the center edge may intersect with the centerline of the nozzle.

In some embodiments, portions of the center member extending between the top edge, the center edge, and the bottom edge have curved shapes. These portions may be referred to as curved segments, connected at the center edge. Each of the two curved segments may have a parabolic shape or a circular shape. In some embodiments, the two curved segments have identical shapes. The angle between the two curved segments at the center edge may be between about 1° and 25°.

In some embodiments, the top panel is configured to pivotably couple to a top wing component, and wherein the bottom panel is configured to pivotably couple to a bottom wing component. Alternatively, at least one of the top panel or the bottom panel is pivotably coupled to the center member. For example, both the top panel and the bottom panel may be pivotably coupled to the center member.

In some embodiments, the top actuator is coupled to the top panel using a top rod. The top rod is connected to a top pivot bearing of the top panel and to a roller bearing extending within a linear slot. The linear slot may be provided within a component of the flight control mechanism or a component of the wing. The top actuator may be a linear actuator or a rotating actuator. The bottom actuator may be coupled to the bottom panel using a bottom rod. The bottom rod may be connected to a bottom pivot bearing of the bottom panel and a roller bearing extending within a linear slot. The linear slot may be provided within a component of the flight control mechanism or a component of the wing. The bottom actuator may be a linear actuator or a rotating actuator.

In some embodiments, the flight control mechanism further comprises a nozzle directed at the center member. Specifically, the nozzle may be directed along the longitudinal axis of the flight control mechanism. The center edge of the center member may coincide with the longitudinal axis of the flight control mechanism. In some embodiments, the flight control mechanism further comprises a valve connected to the nozzle and operable to control the flow of compressed gas from a gas turbine engine of the aircraft to the nozzle.

In some embodiments, the center member may be formed from a honeycomb ceramic. Alternatively, the center member may be formed from titanium or another metal that can meet the thermal and pressure conditions presented by the nozzle gases. The top panel and the bottom panel may be formed from aluminum, composite materials (e.g., carbon fiber reinforced plastics), and other suitable materials.

Also provided is a method of operating an aircraft, such as a short takeoff and vertical landing (STOL) aircraft. The method may comprise determining a flight speed of the aircraft. The aircraft may comprise a first flight control mechanism positioned in a first wing and a second flight control mechanism positioned in a second wing. Each of the first flight control mechanism and the second flight control mechanism may comprise a center member, a top panel, and a bottom panel. The top panel is pivotable relative to the center member around a top pivot axis. The bottom panel is pivotable relative to the center member around a bottom pivot axis.

The method may comprise determining a flight condition of the aircraft. Some examples of the flight condition include a no-change change, a lift-change condition, a roll-change condition, a drag-change condition, an aft-force condition, a forward-force condition, and a yaw-change condition.

The method may comprise determining an operating condition of the nozzle of each of the first flight control mechanism and the second flight control mechanism. The operating condition of the nozzle may be determined based on the flight condition of the aircraft and, in some embodiments, other conditions, such as a flying speed of the aircraft. For example, if the aircraft is operated at a low flying speed or at hovering conditions during which the first wing and the second wing are subject to no or a minimal external airflow, the nozzle may be turned on, e.g., by directing the compressed gas from the turbine engine to the nozzle of one or both of the first flight control mechanism and the second flight control mechanism.

Furthermore, the method may comprise determining the orientation of each of the top panel and the bottom panel of each of the first flight control mechanism and the second flight control mechanism. The orientation may be relative to a longitudinal axis of each of the first flight control mechanism and the second flight control mechanism or relative to the corresponding wing surfaces. Some examples of the orientations include a flush orientation, an inward pivoted orientation, and an outward pivoted orientation. It should be noted that the inward pivoted orientation and the outward pivoted orientation may have different degrees determined by the degree of pivot relative to, for example, the flush orientation. The orientation may be determined based on the flight speed of the aircraft and the flight condition of the aircraft.

The method may comprise positioning each of the top panel and the bottom panel of each of the first flight control mechanism and the second flight control mechanism according to the determined orientation. Furthermore, the method may comprise operating the nozzle of each of the first flight control mechanism and the second flight control mechanism in accordance with the determined operating conditions.

When the flight speed is above a set threshold (e.g., corresponding to the substantial airflow relative to the wings) and when the flight condition is the no-change condition, both of the top panel and the bottom panel of each of the first flight control mechanism and the second flight control mechanism are aligned with an external surface of a corresponding one of the first wing and the second wing. In other words, all panels may be in their respective flush orientations.

When the flight speed is above the set threshold (e.g., corresponding to the substantial airflow relative to the wings) and when the flight condition is the lift-change condition, one of the top panel or the bottom panel of each of the first flight control mechanism and the second flight control mechanism is tilted outward relative to an external surface of a corresponding one of the first wing and the second wing. For example, when the lift-change condition is a lift increase condition, the top panel of each of the first flight control mechanism and the second flight control mechanism may be in its flush orientation, while the bottom panel of each of the first flight control mechanism and the second flight control mechanism is tilted outward relative to the bottom wing surface of the corresponding one of the first wing and the second wings. On the other hand, when the lift-change condition is a lift decrease condition, the bottom panel of each of the first flight control mechanism and the second flight control mechanism may be in its flush orientation, while the top panel of each of the first flight control mechanism and the second flight control mechanism is tilted outward relative to the bottom wing surface of the corresponding one of the first wing and the second wings.

When the flight speed is above a set threshold and when the flight condition is the drag-change condition, both the top panel and the bottom panel of each of the first flight control mechanism and the second flight control mechanism are tilted outward relative to an external surface of a corresponding one of the first wing and the second wing. It should be noted that the top panel may tilted by a different angle than the bottom panel when the flight condition is a combination of the lift change and the drag change. Other combinations are also within the scope and will be easily understood by one having ordinary skill in the art.

When the flight speed is above a set threshold and when the flight condition is the roll-change condition, the top panel of one of the first flight control mechanism is tilted outward relative to an external surface of a corresponding one of the first wing. The lower panel of one of the first flight control mechanism may remain aligned with the lower external surface of the wing. The top panel of the second flight control mechanism on the second wing may remain aligned with the upper wing surface while the lower panel of the second flight control mechanism is tilted outward relative to the lower external surface.

When the flight speed is below a set threshold and when the flight condition is the aft-force condition, the nozzle is turned on, and both the top panel and the bottom panel of each of the first flight control mechanism and the second flight control mechanism are tilted inward relative to an external surface of a corresponding one of the first wing and the second wing.

When the flight speed is below a set threshold and when the flight condition is the forward-force condition, the nozzle is turned on, and both the top panel and the bottom panel of each of the first flight control mechanism and the second flight control mechanism are tilted outward relative to an external surface of a corresponding one of the first wing and the second wing.

When the flight speed is below a set threshold and when the flight condition is the yaw-change condition, the nozzle is turned on, both the top panel and the bottom panel of one of the first flight control mechanism or the second flight control mechanism are tilted outward relative to an external surface of a corresponding one of the first wing and the second wing, while both the top panel and the bottom panel of the other one of the first flight control mechanism or the second flight control mechanism are tilted inward relative to an external surface of a corresponding one of the first wing or the second wing.

When the flight speed is below a set threshold and when the flight condition is the roll-change condition, the nozzle is turned on, the top panel of one of the first flight control mechanism or the second flight control mechanism is tilted inward relative to an external surface of a corresponding one of the first wing or the second wing. Furthermore, the bottom panel of the same one of the first flight control mechanism or the second flight control mechanism is aligned relative to the external surface of the corresponding one of the first wing or the second wing. The top panel of the other one of the first flight control mechanism or the second flight control mechanism is aligned relative to an external surface of the corresponding one of the first wing and the second wing. Finally, the bottom panel of the other one of the first flight control mechanism or the second flight control mechanism is tilted inward relative to the external surface of the corresponding one of the first wing and the second wing.

When the flight speed is below a set threshold and when the flight condition is the lift-change condition, the lift-change condition being a lift-increase condition, the top panel of each the first flight control mechanism and the second flight control mechanism is aligned relative to an external surface of the corresponding one of the first wing and the second wing. The bottom panel of each of the first flight control mechanism and the second flight control mechanism is tilted inward relative to an external surface of a corresponding one of the first wing and the second wing. Specifically, when the aft force, forward force, yaw change, roll change, and lift-change conditions require the use of the flight control mechanisms utilizing the nozzle system, the aircraft is performing a vertical take-off or a vertical landing.

Also provided is an aircraft comprising a flight control system, a wing, a tail, a turbine engine, a flight control mechanism positioned on the wing or the tail. The aircraft may be a short takeoff and vertical landing (STOL) aircraft.

The flight control mechanism comprises a center member, a top panel, and a bottom panel. The top panel is pivotable relative to the center member based on input from the flight control system. The bottom panel is pivotable relative to the center member based on input from the flight control system. It should be noted that the flight control system and the flight control mechanism are different components of the aircraft. The flight control system may be an electronic system positioned in a cockpit of the aircraft. The flight control mechanism may be a thrust generating mechanical device positioned on the wing or the tail of the aircraft.

In some embodiments, the wing comprises a top wing component and a bottom wing component. The top panel may be pivotably coupled to the top wing component. The bottom panel may be pivotably coupled to the bottom wing component. Alternatively, one or both of the top panel and the bottom panel may be pivotably coupled to the center member of the flight control mechanism.

In some embodiments, the flight control mechanism further comprises a nozzle directed at the center member. The flight control mechanism may also comprise a valve connected to the nozzle and operable to control flow of gas from the turbine engine to the nozzle.

In some embodiments, the flight control mechanism of an aircraft comprises a center member, a top panel, a bottom panel, and a nozzle. The top panel may be pivotable relative to the center member in response to a flight condition of the aircraft. The bottom panel may be also pivotable relative to the center member in response to the flight condition of the aircraft. More specifically, the top panel may be independently pivotable relative to the bottom panel. The nozzle may be directed at the center member and operable to direct compressed gas toward the center member in response to the flight condition of the aircraft.

In some embodiments, the top panel is pivotable in a top inward tilt direction and a top outward tilt direction relative to a top flush orientation of the top panel. The top inward tilt direction is opposite of the top outward tilt direction. In the top flush orientation, the top panel is coplanar with the top wing surface of the aircraft. The bottom panel may be also pivotable in a bottom inward tilt direction and a bottom outward tilt direction relative to a bottom flush orientation of the bottom panel. The bottom inward tilt direction is opposite of the bottom outward tilt direction. In the bottom flush orientation, the bottom panel is coplanar with a bottom wing surface of the aircraft.

In some embodiments, the top panel is the top flush orientation and the bottom panel is in the bottom flush orientation when the flight condition is a no-change flight condition. In other words, both the top panel and the bottom panel are coplanar with their respective wing surfaces and do not provide any additional thrust effect besides a lift generated by an airfoil of the wing.

In some embodiments, the top panel is the top flush orientation while the bottom panel is tilted in the bottom outward tilt direction when the flight condition is one of a lift-change or a roll-change. Furthermore, the top panel may be tilted in the top outward tilt direction while the bottom panel may be in the bottom flush orientation when the flight condition is one of a lift-change or a roll-change. It should be noted that the lift-change and the roll condition for the two examples described above may be different.

In some embodiments, the top panel is tilted in the top outward tilt direction and the bottom panel is tilted in the bottom outward tilt direction when the flight condition is one a drag change condition, a forward-force condition, or a yaw-change condition. It should be noted that in some examples, the same orientation of the top panel and the bottom panel may correspond to different flight conditions. Other factors, such as orientations of panels of one or more other flight control mechanisms on the same aircraft, the flight speed of the aircraft, operation of the nozzle of the flight control mechanism may determine one of these different flight conditions. Furthermore, it should be noted that the degree of tilting in outward tilt directions or outward tilts direction may be different depending on the flight conditions. For example, the top panel may be tilted in the top outward tilt direction (or the other direction) at different angles. Likewise, the bottom panel may be tilted in the bottom outward tilt direction (or the other direction) at different angles.

In some embodiments, the top panel is tilted in the top inward tilt direction and the bottom panel is tilted in the bottom inward tilt direction when the flight condition is one of an aft-force condition or a yaw-change condition. Furthermore, the top panel may be tilted in the top inward tilt direction while the bottom panel may be in the bottom flush orientation when the flight condition is a roll-change condition. The top panel may be in the top flush orientation while the bottom panel may be tilted in the bottom inward orientation when the flight condition is a roll-change condition or a lift change condition.

Also provided is an aircraft, such as a short takeoff and vertical landing (STOL) aircraft. The aircraft may comprise a wing and a flight control mechanism. The wing may comprise a top wing surface and a bottom wing surface. The top wing surface may comprise a top opening, while the bottom wing surface may comprise a bottom opening. The flight control mechanism may be disposed at least in part inside the wing between the top wing surface and the bottom wing surface. The flight control mechanism comprises a top panel and a bottom panel independently pivotable relative to the wing. Other aspects of the flight control mechanism are presented above.

In some embodiments, the aircraft further comprises a flight control system. The flight control system is communicatively coupled to a flight control mechanism and operable to control pivoting of the top panel and the bottom panel in response to a flight condition of the aircraft. Some examples of the flight condition include a no-change condition, a lift-change condition, a drag-change condition, a roll-change condition, an aft-force condition, a forward-force condition, and a yaw-change condition. The flight control system may also control various other operations of the aircraft.

In some embodiments, the flight control mechanism comprises a top actuator and a bottom actuator communicatively coupled to the flight control system. The top actuator is coupled to the top panel and is operable to pivot the top panel based on input from the flight control system. The bottom actuator is coupled to the bottom panel and is operable to pivot the bottom panel based on input from the flight control system. The top panel and/or the bottom panel may be pivotably coupled to the wing.

In some embodiments, the aircraft further comprising an engine, operable to generate compressed gas. The flight control mechanism comprises a center member and a nozzle. The nozzle is coupled to the engine and operable to flow the compressed gas toward the center member. The center member is operable to redirect the compressed gas toward the top panel and the bottom panel. The aircraft may further comprise a flight control system communicatively coupled to the flight control mechanism. The flight control system is operable to control pivoting of the top panel and the bottom panel and to control the flow of the compressed gas from the nozzle in response to a flight condition of the aircraft. The aircraft may also comprise a valve controlled by flight control system. The valve is operable to control the flow of the compressed gas from the engine to the nozzle. At least one of the top panel and the bottom panel is pivoted relative to a corresponding one of the top flush orientation or the bottom flush orientation of that panel when the nozzle flows the compressed gas toward the center member. In some embodiments, at least one or both of the top panel and the bottom panel are tilted inward and configured to block the center member from the compressed gas flown by the nozzle toward the center member.

The features and functions that have been discussed can be achieved independently in various examples or may be combined in yet other examples further details of which can be seen with reference to the following description and drawings.

DETAILED DESCRIPTION

Figure 1:
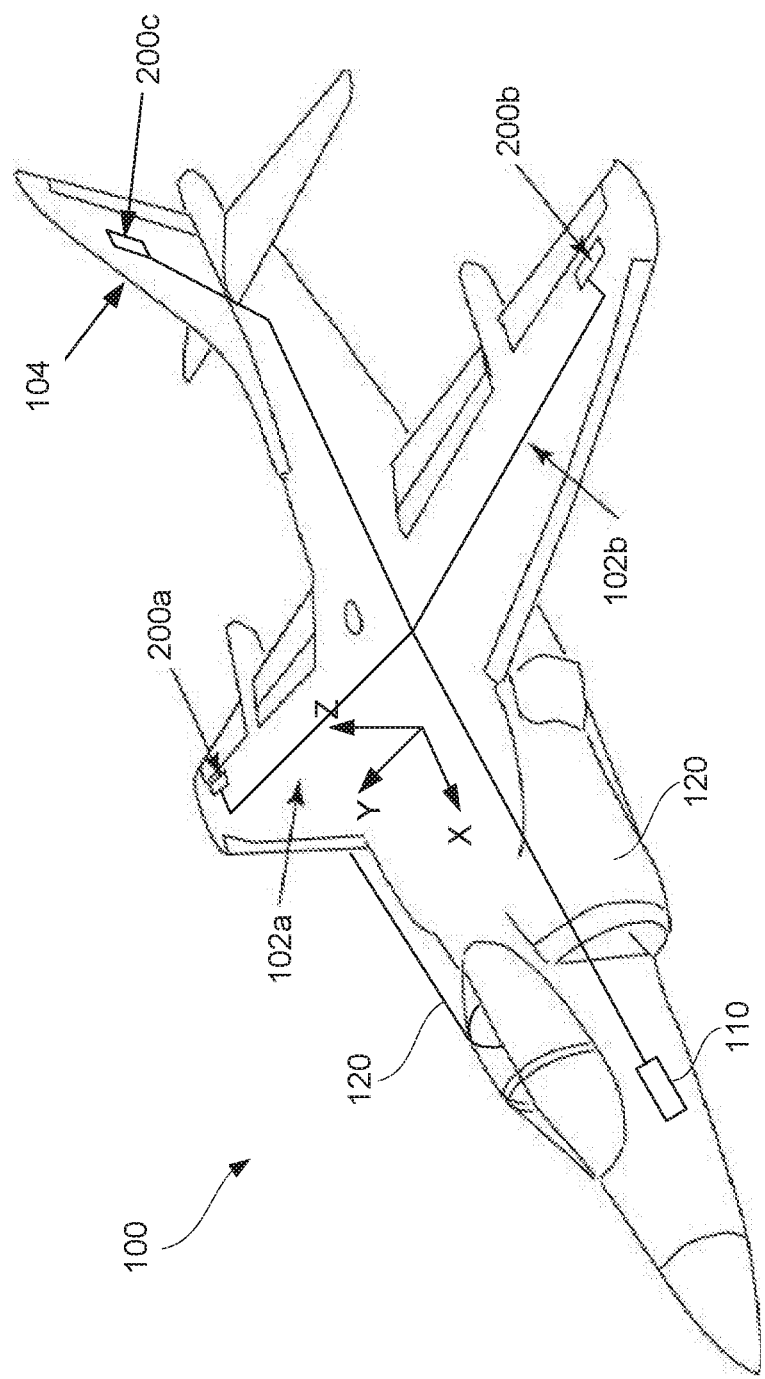
FIG. 1 is a schematic illustration of an aircraft showing wing structures with flight control mechanisms, in accordance with one or more embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting. On the contrary, it is intended to cover alternatives, modifications, and equivalents as may be included within the spirit and scope of the present disclosure as defined by the appended claims.

For example, the techniques of the present disclosure will be described in the context of particular aircraft structures, such as aircraft wings. However, it should be noted that the techniques and mechanisms of the present disclosure may apply to various other vehicle components, and various other vehicle types. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure. Various techniques and mechanisms of the present disclosure will sometimes be described in singular form for clarity. However, it should be noted that some embodiments include multiple iterations of a technique or multiple instantiations of a mechanism unless noted otherwise.

Introduction

The present disclosure describes a flight control mechanism, such as omnidirectional thrust mechanism. The flight control mechanism may be used on an aircraft, such as a short takeoff and vertical landing (STOL) aircraft. Specifically, the flight control mechanism may be located within an aircraft wing or an aircraft tail and may provide enhanced control of aircraft movement and positioning. The flight control mechanism may use active hinged panels to provide control forces to an aircraft at high speeds. Furthermore, the same hinged panels may be also used in conjunction with compressed gas to provide control forces to an aircraft during low speed and hover operations. This includes yaw, roll, and directional control in the forward, aft, and vertical directions. Some embodiments of this flight control mechanism can provide pitch control as well.

In various embodiments, a flight control mechanism is provided on each wing that can provide controlling force in a fore, aft, or vertical direction from hover to high speed flight. Currently, in conventional hover type (non-rotor) aircraft, jet thrusters are used. However, these jet thrusters are only effective at low speeds and can only provide thrust forces in limited directions. For example, the shutter valves on the AV-8 Harrier aircraft can only provide force in two directions opposite from each other. More valves are required if additional directions are required. Furthermore, the shutter valves are not effective at higher speeds.

The flight control mechanism described herein provide a single device on each planform of an aircraft, such as a wing or a vertical tail. The same flight control mechanism provides forces in four or more directions at various speeds, from hovering to high speed flight. Additionally, when not in use, the flight control mechanism remains flush with the surface of the planform, minimizing drag. Overall, comparing to conventional devices, the describe flight control mechanism provides maneuverability in multiple different directions and at a variety of speeds.

To better understand various aspects of different examples of a flight control mechanism, a brief description of an aircraft is now presented. FIG. 1 is a schematic illustration of aircraft 100, in accordance with some embodiments. As depicted in FIG. 1, aircraft 100 is defined by a longitudinal axis (X-axis), a lateral axis (Y-axis), and a vertical axis (Z-axis). In various embodiments, aircraft 100 comprises wings 102, tail 104, flight control system 110, and turbine engine/s 120. Flight control system 110 may be an electronic system positioned in a cockpit of aircraft 100.

Aircraft 100 may further comprise flight control mechanisms 200a-200c. Each of flight control mechanisms 200a-200c may be a thrust generating mechanical device positioned on wing 102 and/or tail 104 of aircraft 100. As shown in FIG. 1, aircraft 100 comprises flight control mechanism 200a positioned in first wing 102a (e.g., right wing) and another flight control mechanism 200b positioned in second wing 102b (e.g., left wing). In some embodiments, tail 104 may additionally, and/or alternatively include flight control mechanism 200c. Aircraft 100 shown in FIG. 1 is one example of a vehicle, in which a flight control mechanism may be implemented and operated.

Figure 2A:
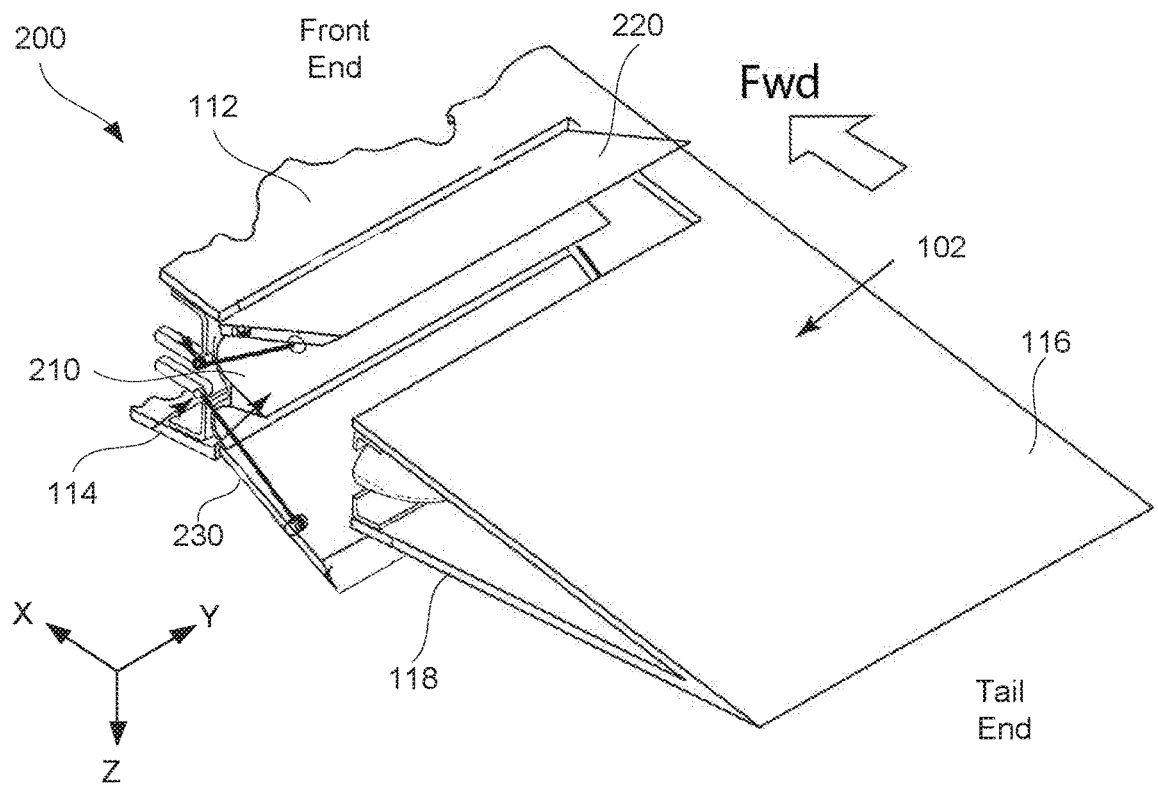
FIG. 2A is a schematic perspective cross-sectional view of an aircraft wing portion with an aircraft wing flight control mechanism, in accordance with one or more embodiments.
Figure 2B:
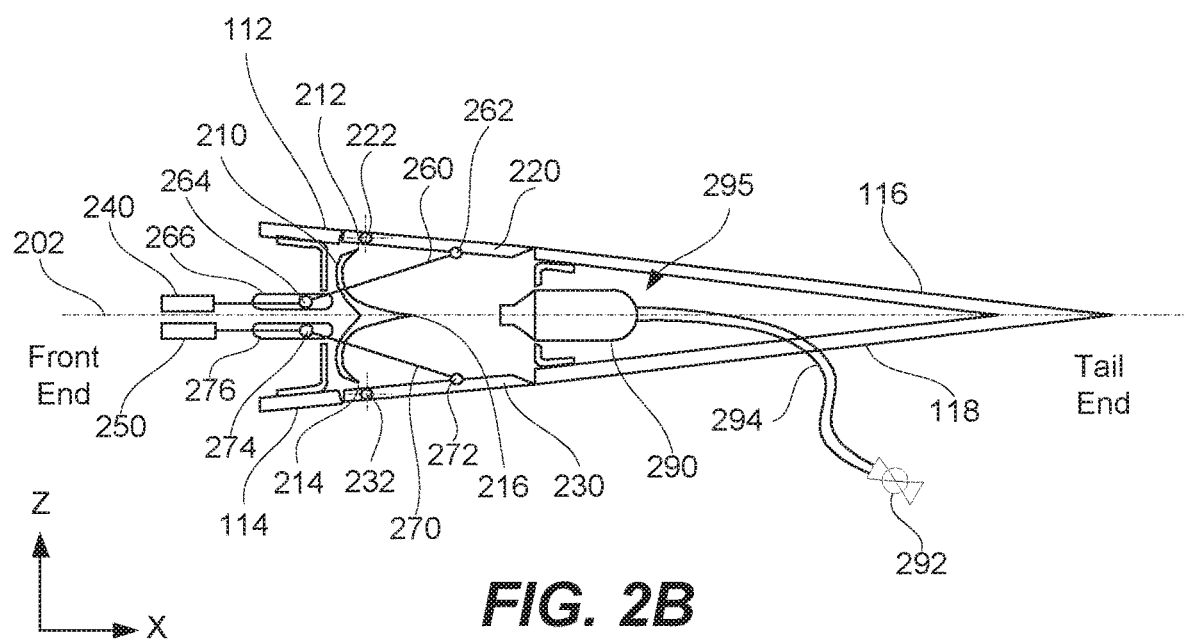
FIG. 2B is a schematic side cross-sectional view of a flight control mechanism in a wing portion, in accordance with one or more embodiments.

Referring to FIGS. 2A and 2B illustrating a portion of wing 102 and flight control mechanism 200 positioned on wing 102. In some embodiments, wing 102 comprises top wing component 112 and bottom wing component 114. Components of flight control mechanism 200, such as top panel 220 and/or bottom panel 230 may be pivotably coupled to top wing component 112 and bottom wing component 114.

Flight Control Mechanism Examples

Figure 2C:
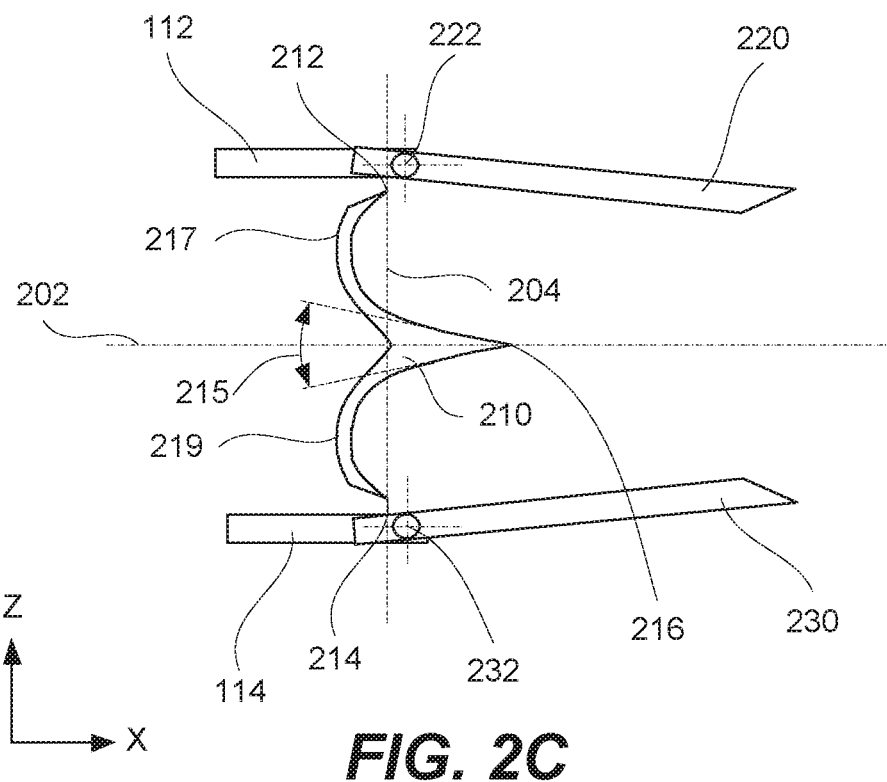
FIGS. 2C-2D are schematic cross-sectional views of an aircraft wing flight control mechanism with alternate configurations of panel coupling, in accordance with one or more embodiments.
Figure 2D:
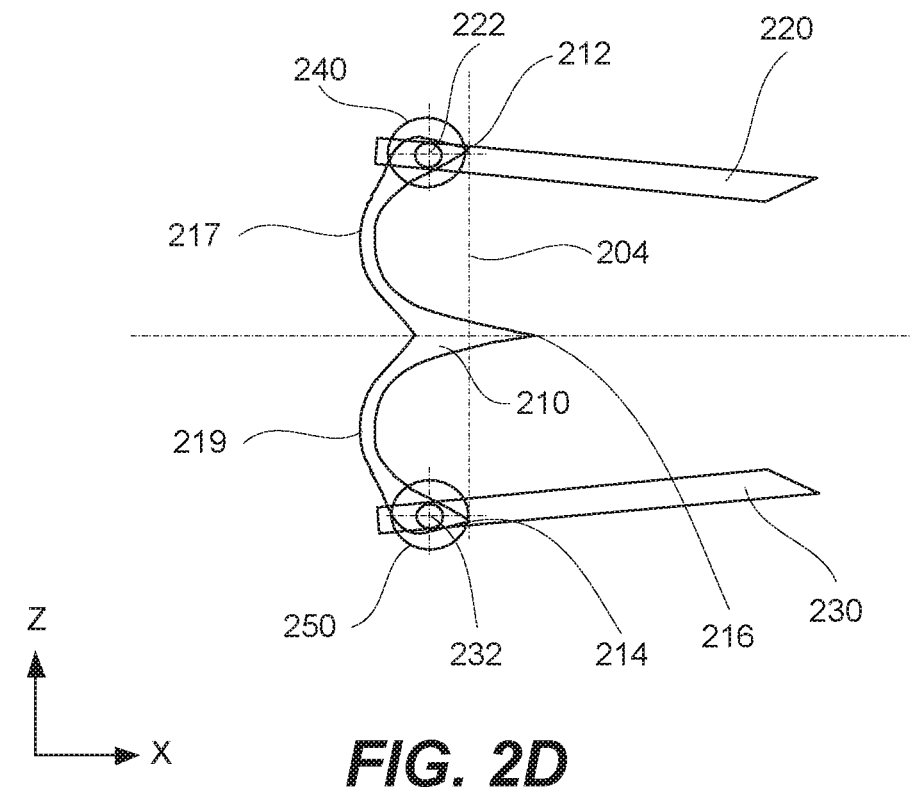

Examples and operation of flight control mechanism 200 will now be described with reference to FIGS. 2A-2D. FIG. 2A is a schematic perspective cross-sectional view of an aircraft wing portion comprising flight control mechanism 200, in accordance with one or more embodiments. FIG. 2B is a schematic side cross-sectional view of flight control mechanism 200, while FIGS. 2C-2D are schematic cross-sectional views of specific components of flight control mechanism 200 showing alternate configurations of panel coupling, in accordance with one or more embodiments. In various embodiments, flight control mechanism 200 shown in FIGS. 2A-2D may be flight control mechanisms 200a, 200b, and/or 200c shown in FIG. 1.

In some examples, flight control mechanism 200 comprises center member 210, top panel 220, bottom panel 230, top actuator 240, and bottom actuator 250. As depicted in FIGS. 2A-2D, flight control mechanism 200 may be defined by longitudinal axis 202. Longitudinal axis 202 may run through the center of flight control mechanism 200 parallel to the X-axis, e.g., parallel to the longitudinal axis of the aircraft.

In various embodiments, center member 210 comprises top edge 212 and bottom edge 214. Top edge 212 may extend toward top panel 220. Bottom edge 214 may extend toward bottom panel 230. Top edge 212 and bottom edge 214 may follow the contour of the surrounding structure, e.g., planform of the wing. In some embodiments, top edge 212 and/or bottom edge 214 may be straight lines. Alternatively, one or both of top edge 212 and bottom edge 214 may be curved. Center member 210 may extend through the entire structure (e.g., the thickness of a wing) of the aircraft. Furthermore, center member 210 may seal a portion of the structure from, e.g., from gases produced by nozzle 290, as further described below.

In some embodiments, center member 210 further comprises center edge 216. Center edge 216 may be used direct gas from nozzle 290 toward top panel 220 and bottom panel 230, as further described below. Center edge 216 may be positioned between top edge 212 and bottom edge 214. In some embodiments, center edge 216 may be equally spaces from top edge 212 and bottom edge 214. Furthermore, center edge 216 may extend parallel to at least one of top edge 212 or bottom edge 214. Center edge 216 may extend along the longitudinal axis 202 (X direction), or perpendicular to the axis in the Y direction.

In some embodiments, top edge 212, center edge 216, and bottom edge 214 of center member 210 form a shape comprising two curved segments. Referring to FIGS. 2C and 2D segment 217 and segment 219 may be defined by top edge 212, center edge 216, and bottom edge 214 and may be connected at center edge 216. Each of two curved segments 217 and 219 may have a parabolic shape and/or a circular shape. Curved segments 217 and 219 may have identical shapes or may have different geometric configurations. In some embodiments, angle 215 between two curved segments 217 and 219 at center edge 216 (which may be referred to as an angle of center edge 216 or sharpness of center edge 216 may be between about 1° and 25° or, more specifically, between about 5° and 15°.

In some embodiments, top edge 212 and bottom edge 214 may extend an equal distance from center edge 216, as currently depicted in FIGS. 2A-2D. However, in some embodiments, top edge 212 and bottom edge 214 may be positioned at different distances from center edge 216. In such embodiments, segments 217 and 219 may have different geometric configurations and/or lengths.

In some embodiments, plane 204 extends through top edge 212 and bottom edge 214 (e.g., when top edge 212 and bottom edge 214 are parallel). As depicted in FIGS. 2C and 2D, plane 204 may be parallel to the Z-axis. Center edge 216 may protrude past plane 204.

Center member 210 may be formed from a honeycomb ceramic. Alternatively, center member 210 may be formed from titanium. In various embodiments, center member 210 may be formed from various materials or combination of materials that provides the desired strength, flexibility, durability, weight, or other desired physical characteristic required for use with high speed flow of air and/or gases from the nozzle.

Referring to FIGS. 2A-2B, FIGS. 4B-4D and FIGS. 5B-5E, each of top panel 220 and bottom panel 230 may independently pivot outward and/or inward. For example, top panel 220 may be pivotable relative to center member 210 based on input from flight control system 110. Bottom panel 230 may be pivotable relative to center member 210 based on input from flight control system 110.

In various embodiments, top panel 220 is pivotable relative to center member 210 around top pivot axis 222 identified in FIG. 2B. Bottom panel 230 is pivotable relative to center member 210 around bottom pivot axis 232. In some embodiments, top pivot axis 222 may be parallel to bottom pivot axis 232. Alternatively, top pivot axis 222 and bottom pivot axis 232 may not be parallel. Top pivot axis 222 and bottom pivot axis 232 may or may not lay within the same plane.

Figure 4A:
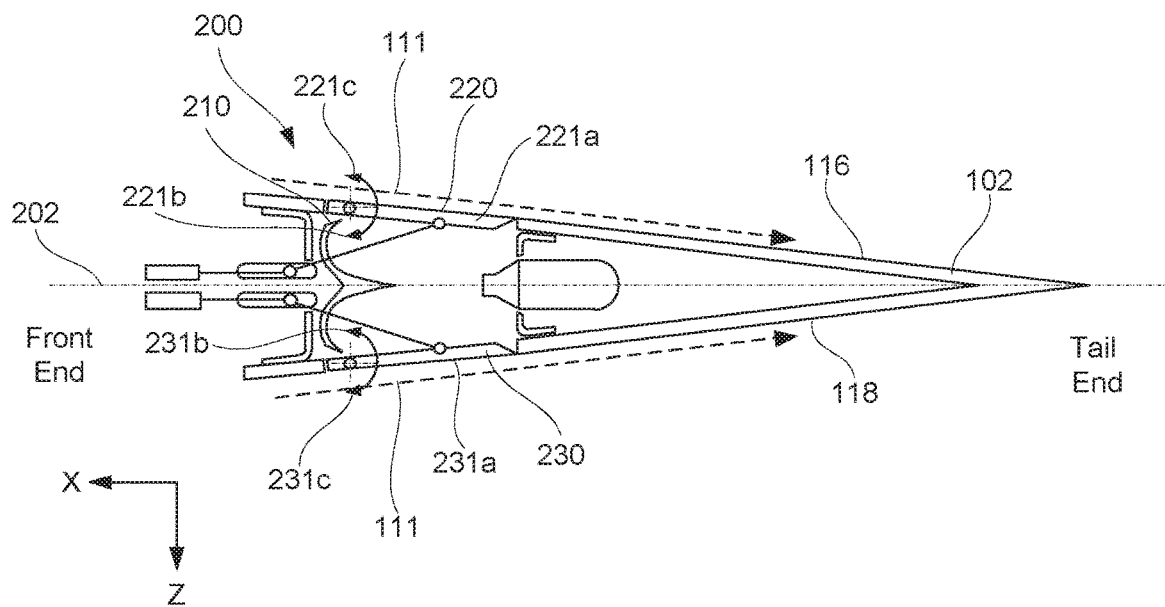
FIGS. 4A-4D illustrate schematic cross-sectional views of various configurations of an aircraft wing flight control mechanism during operation at high flight speeds, in accordance with one or more embodiments.

Referring to FIG. 4A, top panel 220 is pivotable in top inward tilt direction 221b (the clockwise direction in FIG. 4A) and top outward tilt direction 221c (the counterclockwise direction in FIG. 4A). Top inward tilt direction 221b is opposite to top outward tilt direction 221c. Furthermore, top panel 220 is pivotable in these directions relative to top flush orientation 221a of top panel 220. In top flush orientation 221a, top panel 220 is coplanar with top wing surface 116 of aircraft 100 as, for example, shown in FIG. 4A.

Referring to FIG. 4A, bottom panel 230 may be also pivotable in bottom inward tilt direction 231b and bottom outward tilt direction 231c relative to bottom flush orientation 231a of bottom panel 230. Bottom inward tilt direction 231b is opposite of bottom outward tilt direction 231c. In bottom flush orientation 231a, bottom panel 230 is coplanar with a bottom wing surface 118 of aircraft 100 as, for example, shown in FIG. 4A.

In some embodiments, top panel 220 is top flush orientation 221a and bottom panel 230 is in bottom flush orientation 231a, as, for example, shown in FIG. 4A, when flight condition is a no-change flight condition. In other words, both top panel 220 and bottom panel 230 are coplanar with their respective wing surfaces and do not provide any additional thrust effect besides a lift generated by an airfoil of wing.

Figure 3:
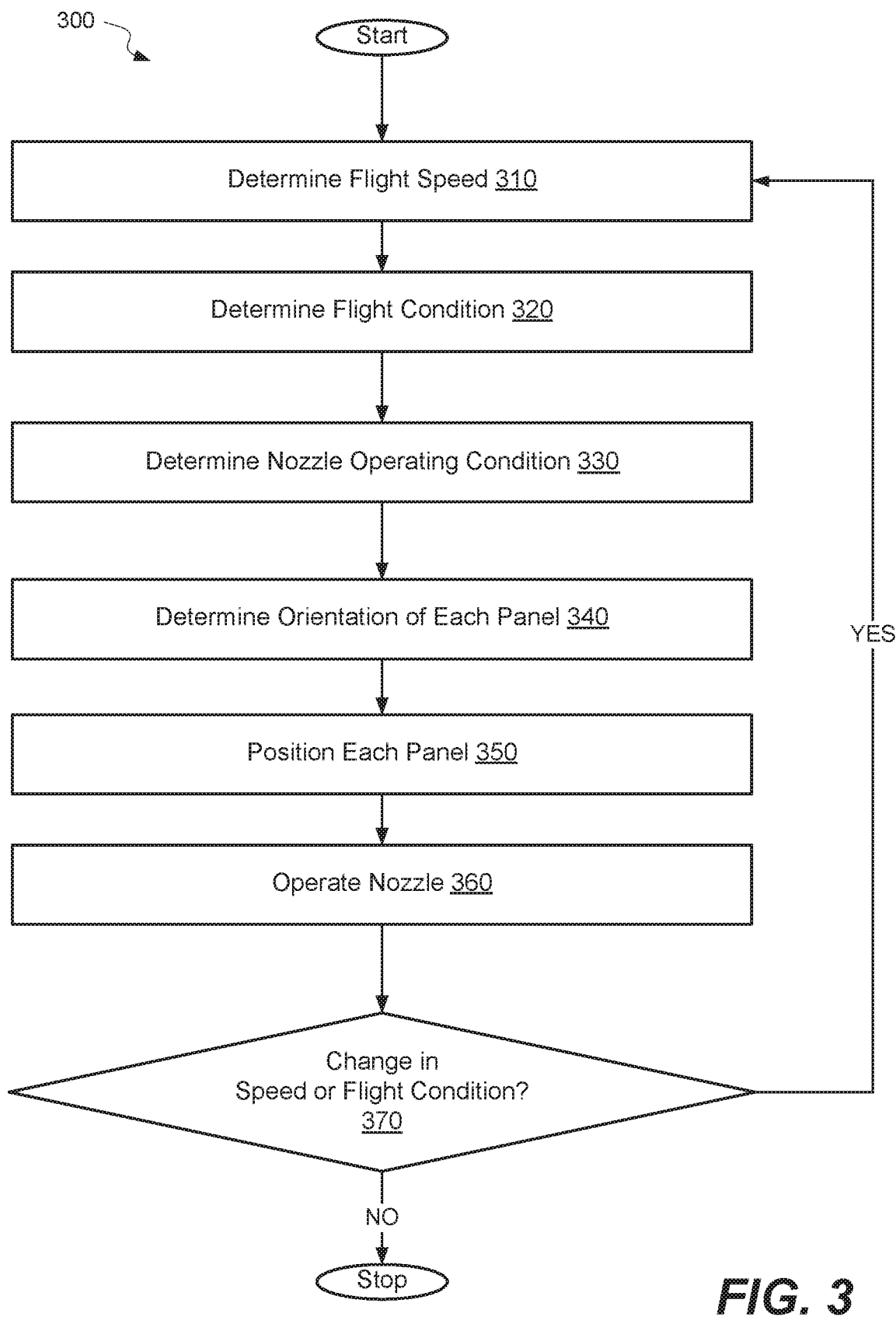
FIG. 3 illustrates a method for operating an aircraft using an aircraft wing flight control mechanism, in accordance with one or more embodiments.
Figure 4B:
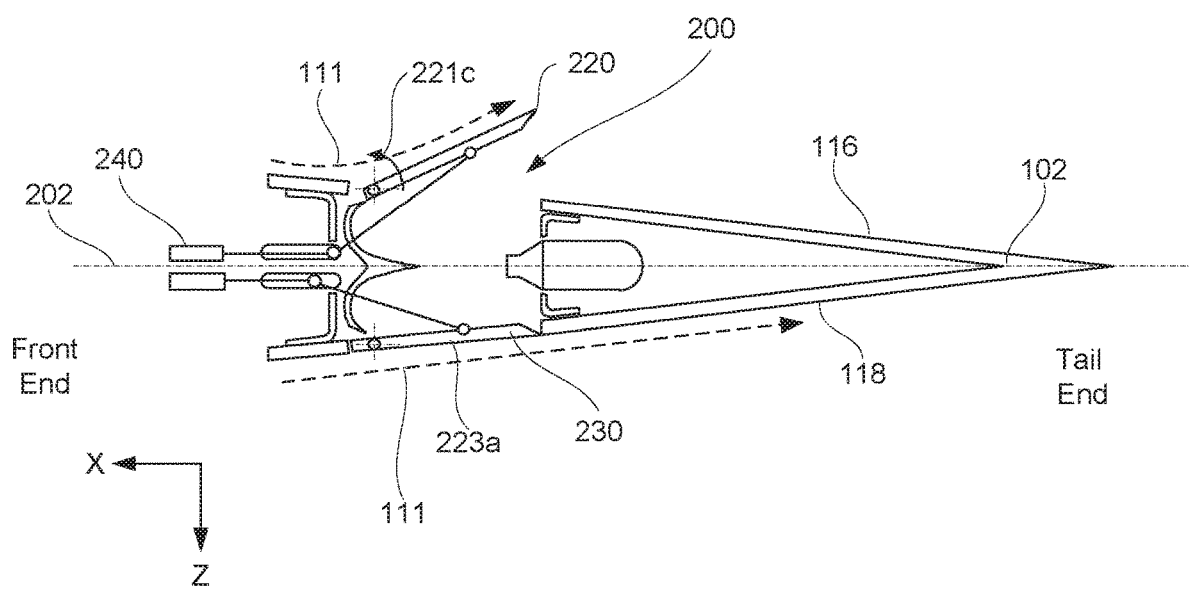
Figure 4C:
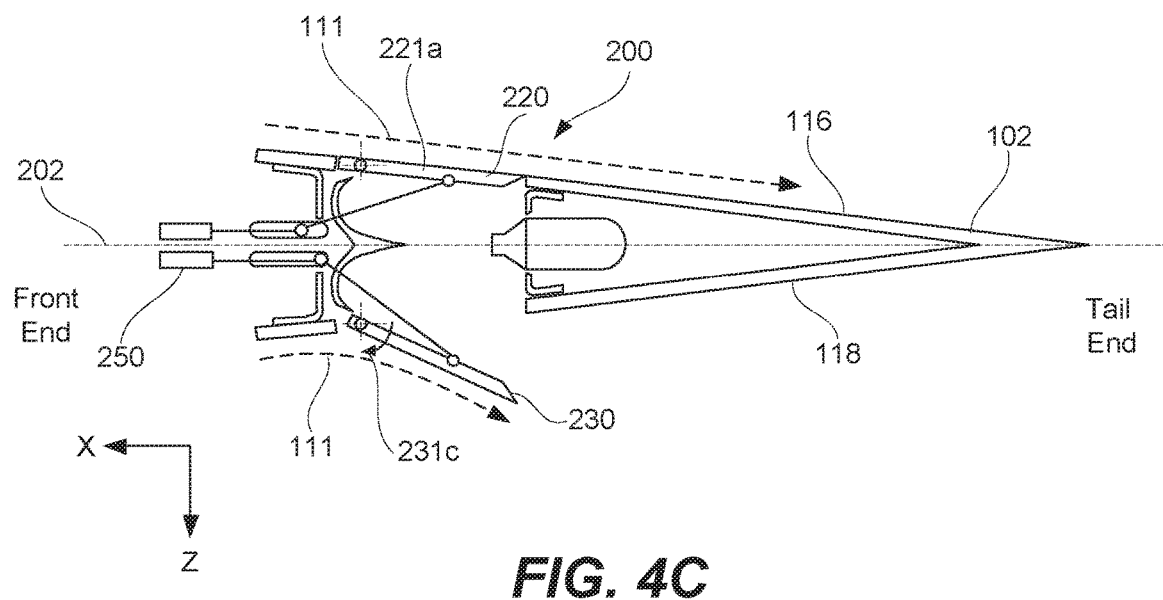

In some embodiments, top panel 220 is top flush orientation 221a while bottom panel 230 is tilted in bottom outward tilt direction 231c as, for example, shown in FIG. 4C, when the flight condition is one of a lift-change or a roll-change. Furthermore, top panel 220 may be tilted in top outward tilt direction 221c while bottom panel 230 may be in bottom flush orientation 231a as, for example, shown in FIG. 4B, when the flight condition is one of a lift-change or a roll-change. It should be noted that lift-change and roll condition for two examples described above may be different. These conditions are further described below with reference to FIG. 3 below.

Figure 4D:
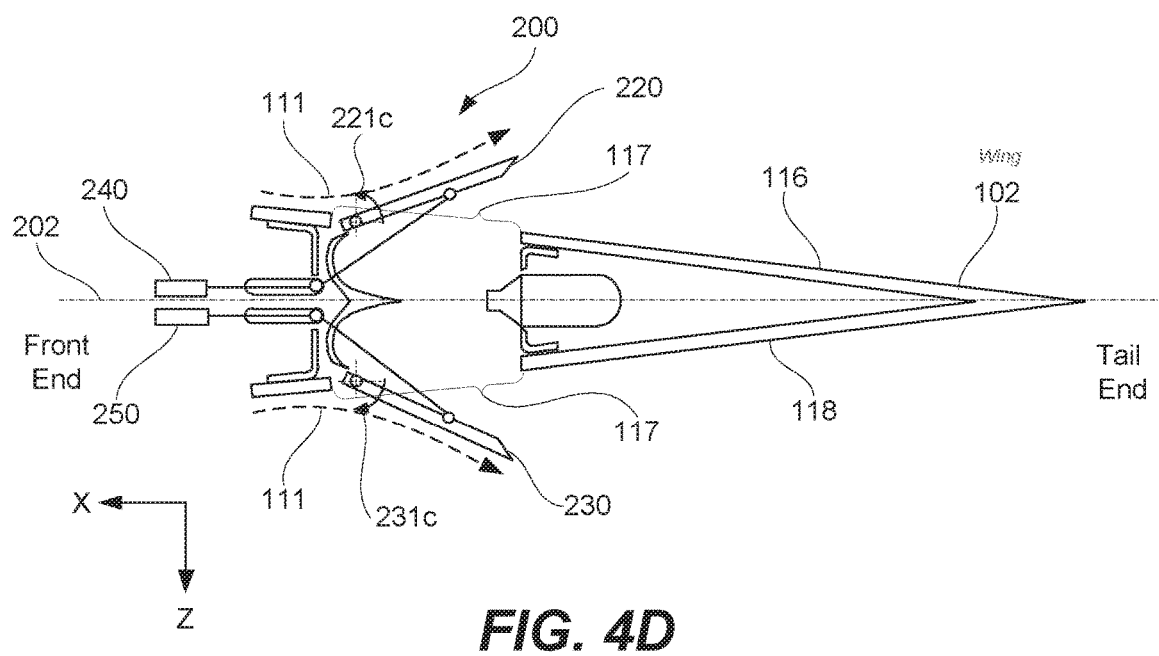
Figure 5A:
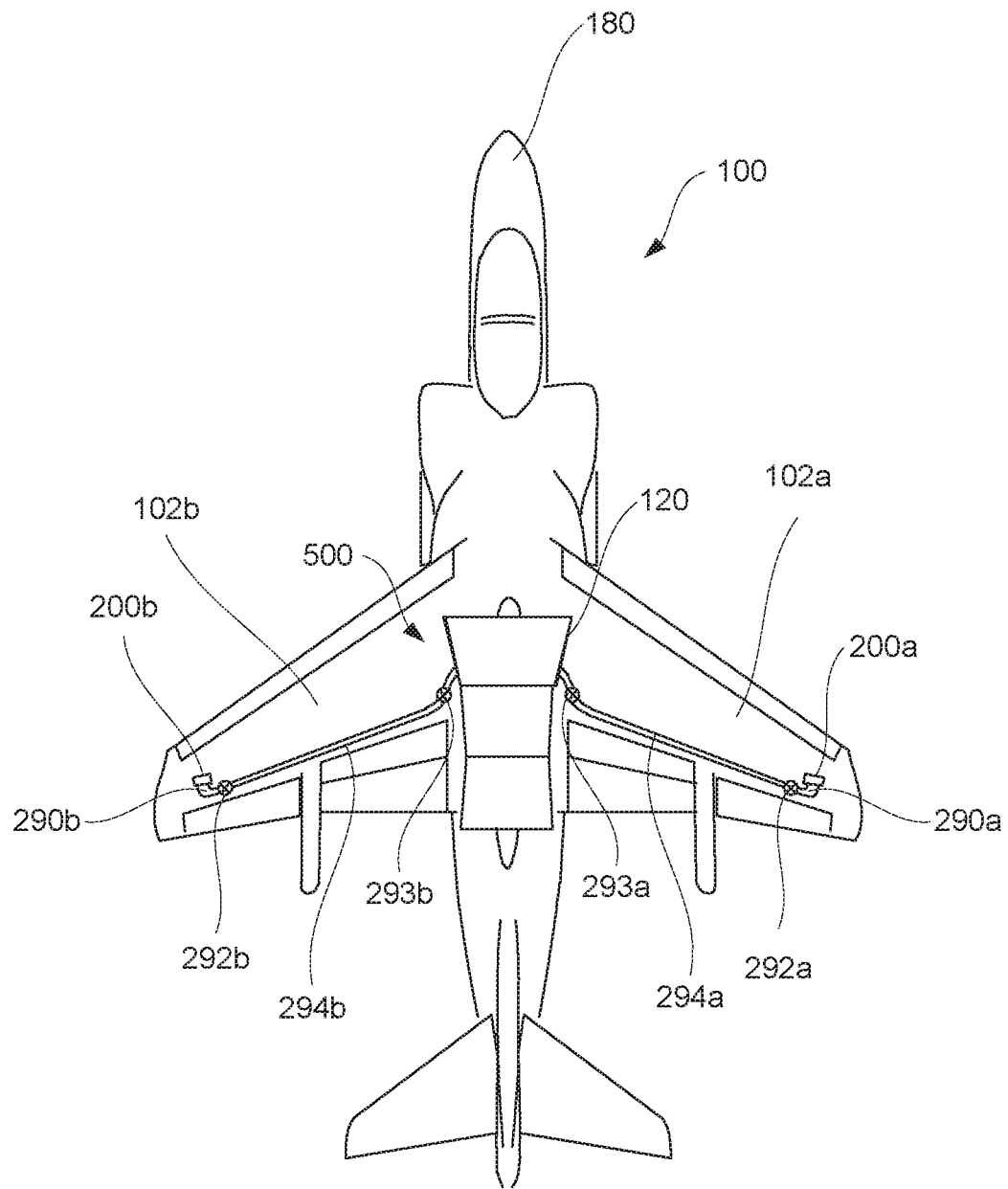
FIG. 5A is a schematic illustration of an aircraft showing a thrust nozzle system, in accordance with one or more embodiments.
Figure 5B:
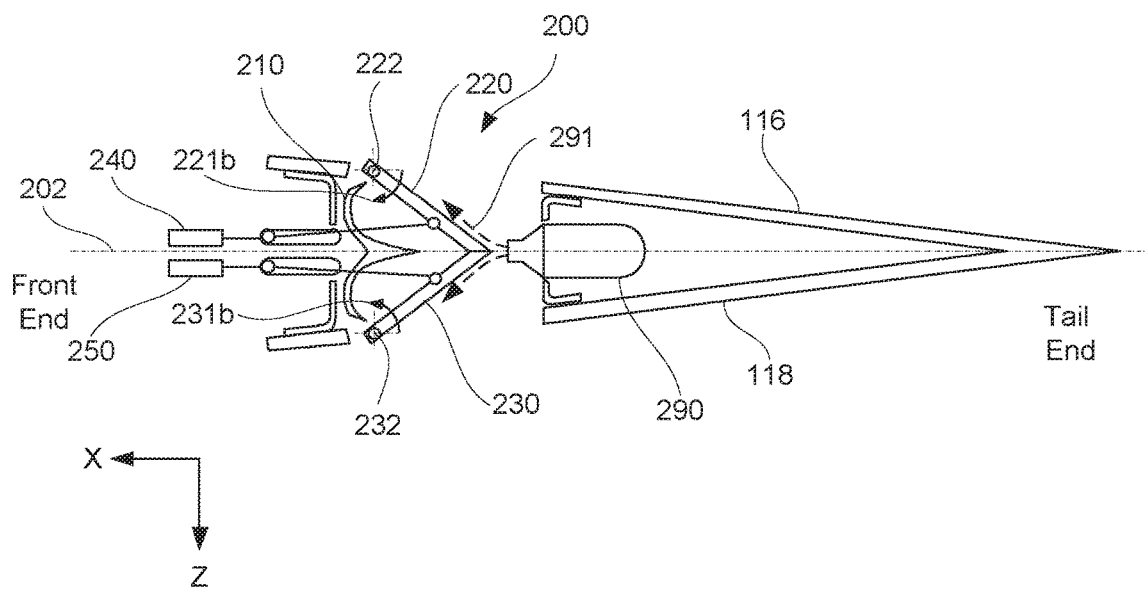
FIGS. 5B-5E illustrate schematic cross-sectional views of various configurations of an aircraft wing flight control mechanism during operation at low flight speeds, in accordance with one or more embodiments.
Figure 5C:
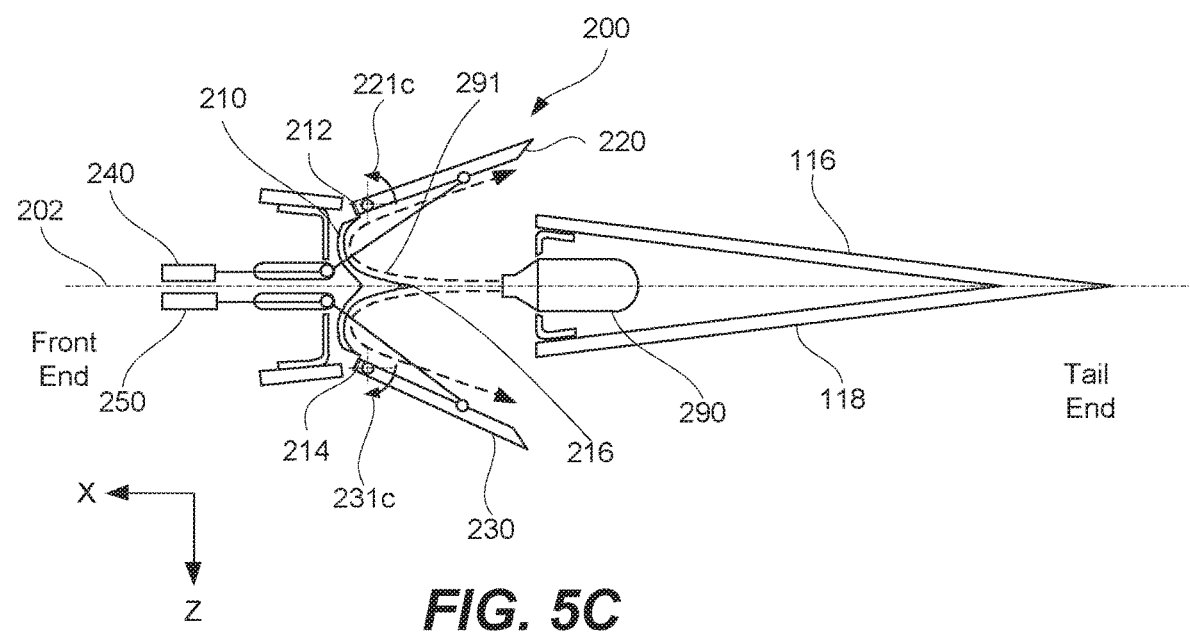

In some embodiments, top panel 220 is tilted in top outward tilt direction 221c and bottom panel 230 is tilted in bottom outward tilt direction 231c as, for example, shown in FIG. 4D and FIG. 5C, when flight condition is one a drag change condition, a forward-force condition, or a yaw-change condition. It should be noted that in some examples, same orientation of top panel 220 and bottom panel 230 may correspond to different flight conditions. Other factors, such as orientations of panels of one or more other flight control mechanisms on same aircraft, flight speed of aircraft, operation of nozzle 290 of flight control mechanism 200 may determine one of these different flight conditions. Furthermore, it should be noted that degree of tilting in outward tilt directions or outward tilts direction may be different depending on flight conditions. For example, top panel 220 may be tilted in top inward tilt direction 221d or other direction at different angles as, for example, schematically shown in FIG. 5B and FIG. 5D. Likewise, bottom panel 230 may be tilted in bottom inward tilt direction 231c or other direction at different angles as, for example, shown in FIG. 5B and FIG. 5E.

In some embodiments, top panel 220 is tilted in top inward tilt direction 221b and bottom panel 230 is tilted in bottom inward tilt direction 231b as, for example, shown in FIG. 5B, when flight condition is one of an aft-force condition or a yaw-change condition. Furthermore, top panel 220 may be tilted in top inward tilt direction 221b while bottom panel 230 may be in bottom flush orientation 231a as, for example, shown in FIG. 5D when flight condition is a roll-change condition. Top panel 220 may be in top flush orientation 221b while bottom panel 230 may be tilted in bottom inward orientation 231b as, for example, shown in FIG. 5E when flight condition is a roll-change condition or a lift change condition.

The outward pivoting of each of top panel 220 and bottom panel 230 corresponds to movement of the panel away from center edge 216 of center member 210 and/or away from longitudinal axis 202. The inward pivoting of each of top panel 220 and bottom panel 230 corresponds to movement of the panel toward center edge 216 and/or away from longitudinal axis 202. In some embodiment, portions of top panel 220 and/or bottom panel 230 may extend past longitudinal axis 202 as, for example, shown in FIGS. 5D and 5E.

The outward pivoting of top panel 220 and/or bottom panel 230 may affect air drag at the top of the wing, the bottom of the wing, or both, at flight speeds above a particular threshold, as further described below. The inward pivoting of top panel 220 and bottom panel 230 may provide additional maneuverability and control of aircraft 100 at flight speeds below a particular threshold, as further described below, with help from nozzle 290.

In some embodiments, top panel 220 is configured to pivotably couple to top wing component 112 as, for example, shown in FIG. 2C. In a similar manner, bottom panel 230 may be configured to pivotably couple to bottom wing component 114 as, for example, also shown in FIG. 2C. Wing components 112 and 114 may be one or more of spars, ribs, or various other support structures of wings 102a and 102b. In some embodiments, only one of top panel 220 or bottom panel 230 is configured to pivotably couple to the respective wing component. The remaining one of top panel 220 or bottom panel 230 may be pivotably coupled to center member 210. For example, the top panel 220 may be pivot ably coupled to top wing component 112, while the bottom panel 230 is pivotably coupled to center member 210. Alternatively, bottom panel 230 may be pivot ably coupled to bottom wing component 114, while the top panel 220 is pivotably coupled to center member 210. In some embodiments, both top panel 220 and bottom panel 230 are pivotably coupled to center member 210 as, for example, shown in FIG. 2D.

In various embodiments, pivoting and/or other movement of top panel 220 and/or bottom panel 230 may be controlled by actuators 240 and 250. As shown in FIG. 2B, top actuator 240 may be coupled to top panel 220 and operable to pivot top panel 220, independently from bottom panel 230. In a similar manner, bottom actuator 250 is coupled to bottom panel 230 and operable to pivot bottom panel 230, independently from top panel 220. Actuators 240 and 250 may be configured such that movement of one panel is dependent upon the movement of the other panel. In some embodiments, top panel 220 and/or bottom panel 230 are pivotable at least 10° in each direction relative to longitudinal axis 202 or, more specifically, at least 25° or at least about 45° or even at least about 60°. In some embodiments, top panel 220 and/or bottom panel 230 may have a greater inward pivoting angle than the outward pivoting angle.

In some embodiments, top actuator 240 is coupled to top panel 220 using top rod 260 as, for example, shown in FIG. 2B. Specifically, top rod 260 may be connected to top pivot bearing 262 of top panel 220. Top rod 260 may be also connected to roller bearing 264 extending within linear slot 266, which may be used as fixed support for pivoting. In various embodiments, top actuator 240 may be a linear actuator (e.g., advancing roller bearing 264 within linear slot 266) or a rotating actuator (e.g., directly connected to top panel 220 for pivoting).

Similarly, bottom actuator 250 may be coupled to bottom panel 230 using bottom rod 270. For example, bottom rod 270 may be connected to bottom pivot bearing 272 of bottom panel 230 and to roller bearing 274 extending within linear slot 276. In various embodiments, bottom actuator 250 may be a linear actuator or a rotating actuator. The operation of top actuator 240 and/or bottom actuator 250 may be controlled by flight control system 110, as further described below.

In various embodiments, flight control mechanism 200 further comprises compressed gas system 295 for providing compressed gas forces to act in conjunction with components of flight control mechanism 200 during operation of aircraft 100. Compressed gas system 295 may comprise nozzle 290 for directing gases to center member 210 and/or panels 220 and 230. Specifically, nozzle 290 may be directed at center member 210 and operable to direct compressed gas toward center member 210 in response to one or more flight conditions of aircraft 100.

Compressed gas system 295 further comprises valve 292 connected to nozzle 290 and operable to control flow of gas, for example, supplied from gas turbine engine 120 of aircraft 100 to nozzle 290, as shown in FIG. 2B. In various embodiments, pathway 294 for the gases may comprise spacing, tubing, piping, or other types of pathways able to contain and direct the flow of compressed gas.

In some embodiments, nozzle 290 is directed at center member 210. Specifically, nozzle 290 may be directed along longitudinal axis 202. As previously described, center edge 216 of center member 210 may also extend along longitudinal axis 202 of flight control mechanism 200. As such, nozzle 290 may be directed at center edge 216 as, for example, shown in FIG. 2B.

Operating Examples

Also provided is a method 300 of operating an aircraft 100. Various aspects of method 300 may be controlled by flight control system 110 or aircraft 100. For example, flight control system 110 may control orientation of top panel 220 and bottom panel 230 of each flight control mechanism 200 on aircraft 100. Flight control system 110 may be an electronic system positioned in a cockpit of aircraft 100.

With reference to FIG. 3, method 300 may comprise determining a flight speed of an aircraft at operation 310. In some embodiments, the aircraft may be aircraft 100. As previously shown with reference to FIG. 1, aircraft 100 may comprise first flight control mechanism 200a positioned, for example, in first wing 102a. Aircraft 100 may further comprise second flight control mechanism 200a positioned in second wing 102b. Each of first flight control mechanism 200a and second flight control mechanism 200b may be flight control mechanism 200 as described above with reference to FIGS. 2A-2D.

In various embodiments, the flight speed of aircraft 100 may be determined by measurement by a pitot-static system. In some embodiments, the flight speed of an aircraft may be determined based on the readings from an airspeed indicator (ASI). The measured airspeed may be indicated in knots. However, other speed rates, such as kilometers per hour (km/h) or even meters per second (m/s), may be used. Various conventions for qualifying airspeed may be used at operation 310, including indicated airspeed (IAS), calibrated airspeed (CAS), equivalent airspeed (EAS), true airspeed (TAS), and density airspeed.

In various embodiments, the flight speed may be categorized as either high speed or low speed. The high-speed categorization may correspond to the speed of aircraft 100 above and/or equal to a determined threshold airspeed. The low speed categorization may correspond to the speed of aircraft 100 below and/or equal to a determined threshold airspeed. The determined threshold airspeed may depend on the size of aircraft and design of first flight control mechanism 200a and second flight control mechanism 200b. In some embodiments, the flight speed of aircraft 100 may be determined by pilot input regardless of actual measured airspeed of aircraft 100.

At operation 320, a flight condition of aircraft 100 may be determined. In various embodiments, various flight conditions may include a no-change condition, a lift-change condition, a roll-change condition, a drag-change condition, an aft-force condition, a forward-force condition, a yaw-change condition, and a pitch-change condition. The flight condition may be determined based on pilot input at a yoke or a control wheel. In some embodiments, the pilot input may be wirelessly received at aircraft 100 from a remotely controlled station, such as in the example of an unmanned aircraft or drone. In yet further embodiments, flight condition may be automatically determined by a flight control computer system.

At operation 330 an operating condition of nozzle 290 of each of first flight control mechanism 200a and second flight control mechanism 200b is determined. For example, the operating condition of nozzle 290 may be set to off during high flight speeds at or above a determined threshold. Furthermore, the operating condition of nozzle 290 may be set to on during low flight speeds at or below a determined threshold.

At operation 340, method 300 may comprise determining an orientation of each of top panel 220 and bottom panel 230 of each of first flight control mechanism 200a and second flight control mechanism 200b, relative to a longitudinal axis 202 of each of first flight control mechanism 200a and second flight control mechanism 200b, based on flight speed of aircraft 100 and flight condition of aircraft 100. Various examples of such positioning are presented in the table below and further described below.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | no-change | Off | Aligned (FIG. 4A) | Aligned (FIG. 4A) | Aligned (FIG. 4A) | Aligned (FIG. 4A) |
| High | lift-change/ increase | Off | Aligned (FIG. 4C) | Tilt Outward (FIG. 4C) | Aligned (FIG. 4C) | Tilt Outward (FIG. 4C) |
| High | lift-change/ decrease | Off | Tilt Outward (FIG. 4B) | Aligned (FIG. 4B) | Tilt Outward (FIG. 4B) | Aligned (FIG. 4B) |
| High | drag-change | Off | Tilt Outward (FIG. 4D) | Tilt Outward (FIG. 4D) | Tilt Outward (FIG. 4D) | Tilt Outward (FIG. 4D) |
| High | Roll-change/ one side | Off | Tilt Outward (FIG. 4B) | Aligned (FIG. 4B) | Aligned (FIG. 4C) | Tilt Outward (FIG. 4C) |
| High | Roll-change/ other side | Off | Aligned (FIG. 4C) | Tilt Outward (FIG. 4C) | Tilt Outward (FIG. 4B) | Aligned (FIG. 4B) |
| Low | aft-force | On | Tilt Inward (FIG. 5B) | Tilt Inward (FIG. 5B) | Tilt Inward (FIG. 5B) | Tilt Inward (FIG. 5B) |
| Low | forward-force | On | Tilt Outward (FIG. 5C) | Tilt Outward - (FIG. 5C | Tilt Outward (FIG. 5C) | Tilt Outward (FIG. 5C) |
| Low | yaw-change/ one way | On | Tilt Inward (FIG. 5B) | Tilt Inward (FIG. 5B) | Tilt Outward (FIG. 5C) | Tilt Outward (FIG. 5C) |
| Low | yaw-change/ another way | On | Tilt Outward (FIG. 5C) | Tilt Outward (FIG. 5C) | Tilt Inward (FIG. 5B) | Tilt Inward (FIG. 5B) |
| Low | Roll-change/ one side | On | Tilt Inward (FIG. 5D) | Aligned (FIG. 5D) | Aligned (FIG. 5E) | Tilt Inward (FIG. 5E) |
| Low | Roll-change/ another side | On | Aligned (FIG. 5E) | Tilt Inward (FIG. 5E) | Tilt Inward (FIG. 5D) | Aligned (FIG. 5D) |
| Low | lift-change/ increase | On | Aligned (FIG. 5E) | Tilt Inward (FIG. 5E) | Aligned (FIG. 5E) | Tilt Inward (FIG. 5E) |

At operation 350, each of top panel 220 and bottom panel 230 of each of first flight control mechanism 200a and second flight control mechanism 200b is positioned according to determined orientation. In some embodiments, the top panel 220 is positioned by activation of top actuator 240, while the bottom panel 230 is positioned by activation of bottom actuator 250.

At operation 360, method 300 may comprise operating nozzle 290 of each of first flight control mechanism 200a and second flight control mechanism 200b in accordance with determined operating conditions. In some embodiments, one or more valves, including valve 292 may be opened to cause gas to flow through nozzle 290 during operation at low speeds or when compressed gas is required. In some embodiments, the one or more valves, including valve 292 may be closed to stop gas from flowing through nozzle 290 during operation at high speeds, or when compressed gas is not required. In some embodiments, nozzle 290 may be adjusted to increase or decrease the pressure of gas being emitted. In some embodiments, nozzle 290 may be adjusted to alter the size of the effective area of the emitted gas.

Examples of Operations at High Speeds

During operation at speeds above a set threshold, all or a majority of the thrust of aircraft 100 is directed toward the aft of aircraft 100 and aircraft 100 travels in a substantially forward direction. With reference to FIGS. 4A-4D, shown are schematic cross-sectional views of various configurations of an aircraft wing flight control mechanism 200 during operation at high flight speeds, in accordance with one or more embodiments. As shown in FIGS. 4A-4D, flight control mechanism 200 is positioned within wing 102. In various embodiments, wing 102 may be second wing 102a (e.g., right wing) and/or second wing 102b (e.g., left wing), and flight control mechanism 200 may be flight control mechanism 200a or 200b located within wing 102a or 102b, respectively.

During operation at high speeds, a no-change condition may correspond to no pilot input to directional controls of aircraft 100. During such no-change condition, both of top panel 220 and bottom panel 230 of each of first flight control mechanism 200a and second flight control mechanism 200b are aligned with an external surface of a corresponding one of first wing 102a and second wing 102b, as depicted in FIG. 4A.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | no-change | Off | Aligned (FIG. 4A) | Aligned (FIG. 4A) | Aligned (FIG. 4A) | Aligned (FIG. 4A) |

During operation at high speeds, a lift-change condition may correspond to pilot input to increase or decrease the lift force of aircraft 100. In various embodiments, when flight speed is above a set threshold and when flight condition is the lift-change condition, one of top panel 220 or bottom panel 230 of each of first flight control mechanism 200a and second flight control mechanism 200b is tilted outward relative to an external surface of a corresponding one of first wing 102a and second wing 102b.

For example, if an increase in lift is indicated, the bottom panel 230 of both the first flight control mechanism 200a and the second flight control mechanism 200b are tilted outward, while the top panel 220 of both flight control mechanisms 200a and 200b are aligned with the external surfaces of wings 102a and 102b, respectively, as shown in FIG. 4C. This redirection of airflow 111 at the bottom wing surfaces 114 and 118 of wings 102a and 102b will increase the pressure differential on wings 102a and 102b, thereby increasing lift of aircraft 100.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | lift-change/ increase | Off | Aligned (FIG. 4C) | Tilt Outward (FIG. 4C) | Aligned (FIG. 4C) | Tilt Outward (FIG. 4C) |

As another example, if a decrease in lift is indicated, the top panel 220 of both the first flight control mechanism 200a and the second flight control mechanism 200b are tilted outward, while the bottom panel 230 of both flight control mechanisms 200a and 200b are aligned with the external surfaces of wings 102a and 102b, respectively, as shown in FIG. 4B. This redirection of airflow 111 at the top surfaces 112 and 116 of wings 102a and 102b will decrease the pressure differential on wings 102a and 102b, thereby decreasing lift of aircraft 100.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | lift-change/ decrease | Off | Tilt Outward (FIG. 4B) | Aligned (FIG. 4B) | Tilt Outward (FIG. 4B) | Aligned (FIG. 4B) |

During operation at high speeds, a drag-change condition may correspond to pilot input to increase the drag of aircraft 100. In various embodiments, when flight speed is above a set threshold and when flight condition is the drag-change condition, both top panel 220 and bottom panel 230 of each of first flight control mechanism 200a and second flight control mechanism 200b are tilted outward relative to an external surface of a corresponding one of first wing 102a and second wing 102b, as shown in FIG. 4D. This redirection of airflow 111 at the top surfaces 112 and 116 and bottom surfaces 114 and 118 of wings 102a and 102b will increase the drag on the wings.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | drag-change | Off | Tilt Outward (FIG. 4D) | Tilt Outward (FIG. 4D) | Tilt Outward (FIG. 4D) | Tilt Outward (FIG. 4D) |

During operation at high speeds, a roll-change condition may correspond to pilot input to maneuver aircraft 100 about the longitudinal X-axis to roll right and/or left. In various embodiments, when flight speed is above a set threshold and when flight condition is the roll-change condition, top panel 220 of one of first flight control mechanism 200a and second flight control mechanism 200b is tilted outward relative to an external surface of a corresponding one of first wing 102a and second wing 102b, and bottom panel 230 of other one of first flight control mechanism 200a and second flight control mechanism 200b is tilted outward relative to an external surface of a corresponding one of first wing 102a and second wing 102b.

For example, when input is received to roll right, top panel 220 of flight control mechanism 200a in second wing 102a (e.g., right wing) may be tilted outward relative to the external top surface 116 of second wing 102a (e.g., right wing), as depicted in FIG. 4B, while bottom panel 230 of flight control mechanism 200b in second wing 102b (e.g., left wing) may be tilted outward relative to the external bottom surface 118 of second wing 102b (e.g., left wing), as depicted in FIG. 4C. This redirection of airflow 111 at the bottom surfaces 114 and 118 of second wing 102b (e.g., left wing) will increase the pressure differential and lift on wing 102b, and redirection of airflow 111 at the top surfaces 112 and 116 of second wing 102a (e.g., right wing) will decrease the pressure differential and lift on wing 102a. This increasing of lift at second wing 102b (e.g., left wing) while decreasing of lift at second wing 102a (e.g., right wing) may result in a right roll about the airplane X-axis.

In some embodiments, top panel 220 of flight control mechanism 200a and bottom panel 230 of flight control mechanism 200b may be tilted by the same degree, or by different degrees. In some embodiments, the degree that each panel is tilted may vary based on the degree of the roll-change condition determined. In some embodiments, only one panel of one flight control mechanism, 200a or 200b, may be tilted based on a roll-change condition of roll right. For example, for a roll right input, only top panel 220 of flight control mechanism 200a in second wing 102a (e.g., right wing) may be tilted outward relative to the external surface of second wing 102a (e.g., right wing), as depicted in FIG. 4B. Alternatively, only bottom panel 230 of flight control mechanism 200b in second wing 102b (e.g., left wing) may be tilted outward relative to the external surface of second wing 102b (e.g., left wing), as depicted in FIG4C. Whether both or only one of such panels are tilted may be based on the degree of the roll-change condition determined.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | Roll-change/ one side | Off | Tilt Outward (FIG. 4B) | Aligned (FIG. 4B) | Aligned (FIG. 4C) | Tilt Outward (FIG. 4C) |

As another example, when input is received to roll left, top panel 220 of second wing 102b (e.g., left wing) may be tilted outward relative to the external top surface 116 of second wing 102b (e.g., left wing), as depicted in FIG. 4B, while bottom panel 230 of second wing 102a (e.g., right wing) may be tilted outward relative to the external bottom surface 118 of second wing 102a (e.g., right wing), as depicted in FIG. 4C. This redirection of airflow 111 at the bottom surfaces 114 and 118 of second wing 102a (e.g., right wing) will increase the pressure differential and lift on wing 102a, and redirection of airflow 111 at the top surfaces 112 and 116 of second wing 102b (e.g., left wing) will decrease the pressure differential and lift on wing 102b. This decreasing of lift at second wing 102b (e.g., left wing) while increasing of lift at second wing 102a (e.g., right wing) may result in a right roll about the airplane X-axis.

In some embodiments, top panel 220 of flight control mechanism 200b and bottom panel 230 of flight control mechanism 200a may be tilted by the same degree, or by different degrees. In some embodiments, the degree that each panel is tilted may vary based on the degree of the roll-change condition determined. In some embodiments, only one panel of one flight control mechanism, 200a or 200b, may be tilted based on a roll-change condition of roll left. For example, for a roll left input, only top panel 220 of flight control mechanism 200b in second wing 102b (e.g., left wing) may be tilted outward relative to the external surface of second wing 102b (e.g., left wing), as depicted in FIG. 4B. Alternatively, only bottom panel 230 of flight control mechanism 200a in second wing 102a (e.g., right wing) may be tilted outward relative to the external surface of second wing 102a (e.g., right wing), as depicted in FIG. 4C. Whether both or only one of such panels are tilted may be based on the degree of the roll-change condition determined.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| High | Roll-change/ other side | Off | Aligned (FIG. 4C) | Tilt Outward (FIG. 4C) | Tilt Outward (FIG. 4B) | Aligned (FIG. 4B) |

In various embodiments, nozzle 290 is deactivated during operation of aircraft 100 at high speeds. However, in some embodiments, nozzle 290 may be activated during operation at high speeds to enhance the maneuverability based on operating conditions determined at 330. For example, nozzle 290 may be activated during a lift-change condition in order to increase the rate at which the lift of aircraft 100 is increased or decreased. As another example, nozzle 290 may be activated during a roll-change condition in order to increase the rate at which the aircraft rolls right and/or left.

Examples of Operation at Low Speeds

During operation at speeds below a set threshold, all or a majority of the thrust of aircraft 100 may not be directed toward the aft of aircraft 100 and aircraft 100 may be hovering, or moving in any direction. However, aircraft 100 may additionally, and/or alternatively, be traveling in a substantially forward direction during operation at speeds below a set threshold. In various embodiments, nozzle 290 is activated, or turned on, during operation at speeds at or below the set threshold. In various examples, activation of nozzle 290 corresponds to the opening and/or closing of valve 292. With reference to FIG. 5A, shown is a schematic illustration of an aircraft showing a thrust nozzle system 500, in accordance with one or more embodiments. As previously described thrust nozzle system 500 may include turbine engine 120 with a pathway 294 leading to a nozzle 290. As shown in FIG. 5, second wing 102a (e.g., right wing) includes pathway 294a leading to nozzle 290a, and second wing 102b (e.g., left wing) includes pathway 294b leading to nozzle 290b. As also previously described, valves 292a and 292b may be operated to control the flow of gas from turbine engine through nozzles 290a and 290b, respectively. In some embodiments, thrust nozzle system may include additional valves 293a and 293b, which may be operated to additionally control the flow of gas from turbine engine, and/or function as redundant back-up valves.

With reference to FIGS. 5B-5E, shown are schematic cross-sectional views of various configurations of an aircraft wing flight control mechanism 200 during operation at low flight speeds, in accordance with one or more embodiments. As shown in FIGS. 5B-5E, flight control mechanism 200 is positioned within wing 102. In various embodiments, wing 102 may be second wing 102a (e.g., right wing) and/or second wing 102b (e.g., left wing), and flight control mechanism 200 may be flight control mechanism 200a or 200b located within wing 102a or 102b, respectively. Likewise, nozzle 290 may be nozzle 290a or 290b located within wing 102a or 102b, respectively.

During operation at low speeds, an aft-force condition may correspond to pilot input to decrease forward speed of aircraft 100 and/or move aircraft 100 in a substantially aft direction. In various embodiments, when flight speed is below a set threshold and when flight condition is the aft-force condition, nozzle 290 is turned on, and both top panel 220 and bottom panel 230 of each of first flight control mechanism 200a and second flight control mechanism 200b are tilted inward relative to an external surface of a corresponding one of first wing 102a and second wing 102b. In other words, both the top panel 220 and the bottom panel 230 of both flight control mechanisms 200a and 200b are tilted inward relative to the top wing surface 116 and the bottom wing surface 118, respectively, of each wing 102a and 102b, as shown in FIG. 5B. This may cause compressed gas 291 to be emitted toward the front end of wings 102a and 102b to effect an aft-force on aircraft 100. For optimal performance, the edge of the upper panel may contact the edge of the lower panel to close off any openings between the panels to gas insertion.

In some embodiments, top panel 220 and bottom panel 230 of each flight control mechanism 200a and 200b may be tilted by the same degree, or by different degrees. In various embodiments, the level to which nozzle 290 is activated may be based on the on the level of the aft-force condition determined. For example, a higher gas pressure may be emitted for higher aft-force.

During operation at low speeds, a forward-force condition may correspond to pilot input to increase forward speed of aircraft 100 and/or move aircraft 100 in a substantially forward direction. In various embodiments, when flight speed is below a set threshold and when flight condition is forward-force condition, nozzle 290 is turned on, and both top panel 220 and bottom panel 230 of each of first flight control mechanism 200a and second flight control mechanism 200b are tilted outward relative to an external surface of a corresponding one of first wing 102a and second wing 102b. In other words, both the top panel 220 and the bottom panel 230 of both flight control mechanisms 200a and 200b are tilted outward relative to the top wing surface 116 and the bottom wing surface 118, respectively, of each wing 102a and 102b, as shown in FIG. 5C. This may cause compressed gas 291 to be emitted toward the tail end of wings 102a and 102b to effect a forward-force on aircraft 100.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| Low | forward-force | On | Tilt Outward (FIG. 5C) | Tilt Outward - (FIG. 5C | Tilt Outward (FIG. 5C) | Tilt Outward (FIG. 5C) |

During operation at low speeds, a yaw-change condition may correspond to pilot input to maneuver aircraft 100 about the vertical Z-axis to yaw right and/or left. In various embodiments, when flight speed is below a set threshold and when flight condition is yaw-change condition, nozzle 290 is turned on, both top panel 220 and bottom panel 230 of one of first flight control mechanism 200a or second flight control mechanism 200b are tilted outward relative to an external surface of a corresponding one of first wing 102a and second wing 102b, while both top panel 220 and bottom panel 230 of other one of first flight control mechanism 200a or second flight control mechanism 200b are tilted inward relative to an external surface of a corresponding one of first wing 102a and second wing 102b.

For example, when input is received to maneuver nose right, both top panel 220 and bottom panel 230 of flight control mechanism 200a in second wing 102a (e.g., right wing) are tilted inward relative to the external surfaces 116 and 118 of second wing 102a (e.g., right wing), as depicted in FIG. 5B, while both top panel 220 and bottom panel 230 of flight control mechanism 200b in second wing 102b (e.g., left wing) are tilted outward relative to the external surfaces 116 and 118 of second wing 102b (e.g., left wing), as depicted in FIG. 5C. This may cause compressed gas 291 to be emitted toward the front end at second wing 102a (e.g., right wing) and toward the tail end at second wing 102b (e.g., left wing) to cause aircraft 100 to rotate toward the right.

As another example, when input is received to maneuver nose left, both top panel 220 and bottom panel 230 of flight control mechanism 200b in second wing 102b (e.g., left wing) are tilted inward relative to the external surfaces 116 and 118 of second wing 102b (e.g., left wing), as depicted in FIG. 5B, while both top panel 220 and bottom panel 230 of flight control mechanism 200a in second wing 102a (e.g., right wing) are tilted outward relative to the external surfaces 116 and 118 of second wing 102a (e.g., right wing), as depicted in FIG. 5C. This may cause compressed gas 291 to be emitted toward the front end at second wing 102b (e.g., left wing) and toward the tail end at second wing 102a (e.g., right wing) to cause aircraft 100 to rotate toward the left.

In some embodiments, only flight control mechanism 200a or 200b may be operated during a yaw-change condition. For example, for a nose right maneuver input, only the

| Flight Speed | Flight Condition | Nozzle | Top Panel of First FCM | Bottom Panel First FCM | Top Panel of Second FCM | Bottom Panel of Second FCM |
|---|---|---|---|---|---|---|
| Low | aft-force | On | Tilt Inward (FIG. 5B) | Tilt Inward (FIG. 5B) | Tilt Inward (FIG. 5B) | Tilt Inward (FIG. 5B) | panels of second wing 102a (e.g., right wing) may be tilted inward, and only nozzle 290a may be activated, as depicted in FIG. 5B. Alternatively, only the panels of second wing 102b (e.g., left wing) may be tilted outward, and only nozzle 290b may be activated, as depicted in FIG. 5C. As another example, for a nose left maneuver input, only the panels of second wing 102b (e.g., left wing) may be tilted inward, and only nozzle 290b may be activated, as depicted in FIG. 5B. Alternatively, only the panels of second wing 102a (e.g., right wing) may be tilted outward, and only nozzle 290a may be activated, as depicted in FIG. 5C. Whether both or only one of such flight control mechanisms are activated may be based on the degree of the yaw-change condition determined.

wing), thereby increasing lift at second wing 102b (e.g., left wing) while decreasing lift at second wing 102a (e.g., right wing), and causing aircraft 100 to roll right about the longitudinal X-axis.

Figure 5D:
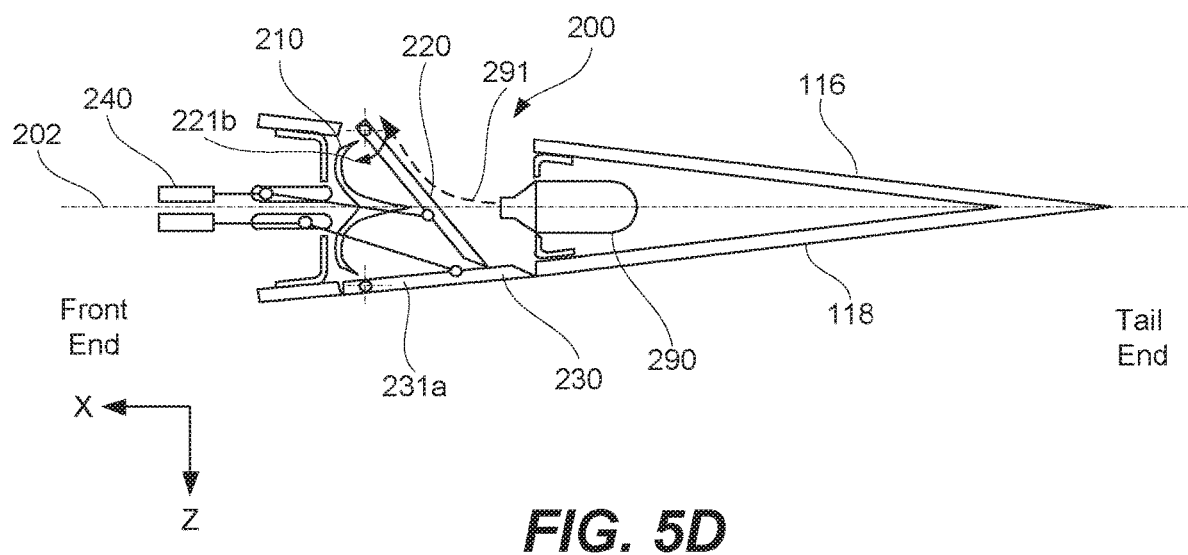
Figure 5E:
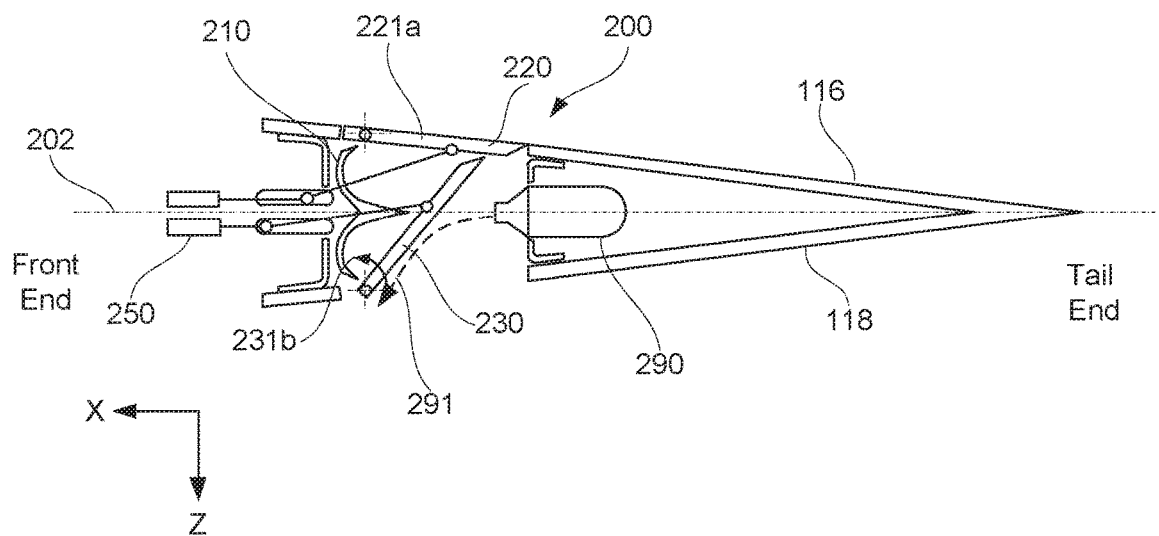

As another example, when input is received to roll left, top panel 220 of flight control mechanism 200b in second wing 102b (e.g., left wing) may be tilted inward relative to the top surface 116 of second wing 102b (e.g., left wing), as depicted in FIG. 5D, while bottom panel 230 of flight control mechanism 200a in second wing 102a (e.g., right wing) may be tilted inward relative to the bottom surface 118 of second wing 102a (e.g., right wing), as depicted in FIG. 5E. This may cause compressed gas 291 to be emitted upward at

| Flight Speed | Flight Condition | Nozzle | Top Panel of First FCM | Bottom Panel First FCM | Top Panel of Second FCM | Bottom Panel of Second FCM |
|---|---|---|---|---|---|---|
| Low | yaw-change/ one way | On | Tilt Inward (FIG. 5B) | Tilt Inward (FIG. 5B) | Tilt Outward (FIG. 5C) | Tilt Outward (FIG. 5C) |
| Low | yaw-change/ another way | On | Tilt Outward (FIG. 5C) | Tilt Outward (FIG. 5C) | Tilt Inward (FIG. 5B) | Tilt Inward (FIG. 5B) |

During operation at low speeds, a roll-change condition may correspond to pilot input to maneuver aircraft 100 about the longitudinal X-axis to roll right and/or left. In various embodiments, when flight speed is below a set threshold and when flight condition is roll-change condition, nozzle 290 is turned on, top panel 220 of one of first flight control mechanism 200a or second flight control mechanism 200b is tilted inward relative to an external surface of a corresponding one of first wing 102a and second wing 102b. Furthermore, bottom panel 230 of same one of first flight control mechanism 200a or second flight control mechanism 200b is aligned relative to external surface of corresponding one of first wing 102a and second wing 102b. Additionally, top panel 220 of other one of first flight control mechanism 200a or second flight control mechanism 200b is aligned relative to an external surface of corresponding one of first wing 102a and second wing 102b. Finally, bottom panel 230 of other one of first flight control mechanism 200a or second flight control mechanism 200b is tilted inward relative to external surface of corresponding one of first wing 102a and second wing 102b.

For example, when input is received to roll right, top panel 220 of flight control mechanism 200a in second wing 102a (e.g., right wing) may be tilted inward relative to the top surface 116 of second wing 102a (e.g., right wing), as depicted in FIG. 5D, while bottom panel 230 of flight control mechanism 200b in second wing 102b (e.g., left wing) may be tilted inward relative to the bottom surface 118 of second wing 102b (e.g., left wing), as depicted in FIG. 5E. This may cause compressed gas 291 to be emitted upward at second wing 102a (e.g., right wing) and cause compressed gas 291 to be emitted downward at second wing 102b (e.g., left second wing 102b (e.g., left wing) and cause compressed gas 291 to be emitted downward at second wing 102a (e.g., right wing), thereby increasing lift at second wing 102a (e.g., right wing) while decreasing lift at second wing 102b (e.g., left wing), and causing aircraft 100 to roll left about the longitudinal X-axis.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| Low | Roll-change/ one side | On | Tilt Inward (FIG. 5D) | Aligned (FIG. 5D) | Aligned (FIG. 5E) | Tilt Inward (FIG. 5E) |
| Low | Roll-change/ another side | On | Aligned (FIG. 5E) | Tilt Inward (FIG. 5E) | Tilt Inward (FIG. 5D) | Aligned (FIG. 5D) |

During operation at low speeds, a lift-change condition may correspond to pilot input to increase or decrease the lift force of aircraft 100. In various embodiments, when flight speed is below a set threshold and when flight condition is lift-change condition, lift-change condition being a lift-increase condition, top panel 220 of each first flight control mechanism 200a and second flight control mechanism 200b is aligned relative to an external surface of corresponding one of first wing 102a and second wing 102b. Additionally, bottom panel 230 of each of first flight control mechanism 200a and second flight control mechanism 200b is tilted inward relative to an external surface of a corresponding one of first wing 102a and second wing 102b.

For example, when an increase in lift is indicated by the lift-change condition, the bottom panel 230 of both flight control mechanisms 200a and 200b may be tilted inward relative to bottom wing surface 118 of each wing, while the top panel 220 of both flight control mechanisms 200a and 200b may be aligned with top wing surface 116 of each wing, ad depicted in FIG. 5E. This may cause compressed gas 291 to be emitted downward at both second wing 102a (e.g., right wing) and second wing 102b (e.g., left wing), thereby increase lift at both wings. In various embodiments, when the lift-change condition corresponds to a lift-increase, aircraft 100 may be performing a vertical take-off or a vertical landing.

In some embodiments, during a lift-change condition during operation at low speeds, top panel 220 of both wings 102a and 102b may additionally be tilted downward relative to the top wing surface 116 of each wing. This may cause a portion of compressed gas 291 to be emitted upward at each wing providing a decrease in lift. Such decrease in lift may be used for additionally maneuverability during an upward or downward lift-change condition.

| Flight Speed | Flight Condition | Nozzle | Top Panel of First FCM | Bottom Panel First FCM | Top Panel of Second FCM | Bottom Panel of Second FCM |
|---|---|---|---|---|---|---|
| Low | lift-change/ increase | On | Aligned (FIG. 5E) | Tilt Inward (FIG. 5E) | Aligned (FIG. 5E) | Tilt Inward (FIG. 5E) |

Aircraft Examples

Flight control mechanism 200 may be used on various types of aircraft 100, such as a short takeoff and vertical landing (STOL) aircraft. Referring to FIG. 1 and the above description, aircraft 100 may comprise wing 102 and one or more flight control mechanisms 200a-200c. Referring to FIG. 4D, wing 102 may comprise top wing surface 116 and bottom wing surface 118. Top wing surface 116 may comprise top opening 117, while bottom wing surface 118 may comprise bottom opening 119. Flight control mechanism 200 may be disposed at least in part inside wing 102 between top wing surface 116 and bottom wing surface 118. It should be noted that when at least one top panel 220 or bottom panel 230 is tilted in their respective outward tilt direction, this panel protrudes above the corresponding wing surface. For example, FIG. 4B illustrate top panel 220 tilted in top outward tilt direction 221c and top panel 220 protrudes above top wing surface 116. In a similar manner, FIG. 4C illustrate bottom panel 230 tilted in bottom outward tilt direction 231c and bottom panel 230 protrudes above bottom wing surface 118. FIG. 4D illustrate an example in which both top panel 220 and bottom panel 230 are tilted in their respective outward tilt directions and both protrude above their respective wing surfaces. Various aspects of flight control mechanism 200 are presented above.

Referring to FIG. 1, aircraft 100 may comprise flight control system 110. Flight control system 110 is communicatively coupled to each of flight control mechanisms 200a-200c. Flight control system 110 is operable to control pivoting of top panel 220 and bottom panel 230 of each of flight control mechanisms 200a-200c in response to flight condition of aircraft 100. Some examples of flight condition include a no-change condition, a lift-change condition, a drag-change condition, a roll-change condition, an aft-force condition, a forward-force condition, and a yaw-change condition. Flight control system 110 may also control various other operations of aircraft 100.

As described above with reference to FIG. 2A, flight control mechanism 200 comprises top actuator 240 and bottom actuator 250. Top actuator 240 is coupled to top panel 220, while bottom actuator 250 is coupled to bottom panel 230. Both top actuator 240 and bottom actuator 250 may be communicatively coupled to flight control system 110. Specifically, top actuator 240 is operable to pivot top panel 220 based on input from flight control system 110. Bottom actuator 250 is operable to pivot bottom panel 230 based on input from flight control system 110.

Referring to FIG. 1 and FIG. 5A, aircraft 100 further comprising an engine 120, operable to generate compressed gas. Nozzle 290 is coupled to engine 120 and operable to flow compressed gas toward center member 210. As shown in FIG. 5C, center member 210 may be operable to redirect compressed gas toward top panel 220 and bottom panel 230.

Flight control system 110 may be operable to control flow of compressed gas from nozzle 290 in response to flight condition of aircraft 100. Aircraft 100 may also comprise valve 292 controlled by flight control system 110. Valve 292 is operable to control flow of compressed gas from engine 120 to nozzle 290. A shown in FIGS. 5B-5E, at least one of top panel 220 and bottom panel 230 is pivoted relative to corresponding one of top flush orientation 221a or bottom flush orientation 221b of that panel when nozzle 290 flows compressed gas toward center member 210. A shown in FIGS. 5B, 5D and 5E, In some embodiments, at least one or both of top panel 220 and bottom panel 230 are tilted inward and configured to block center member 210 from compressed gas flown by nozzle 290 toward center member 210.

Figure 6:
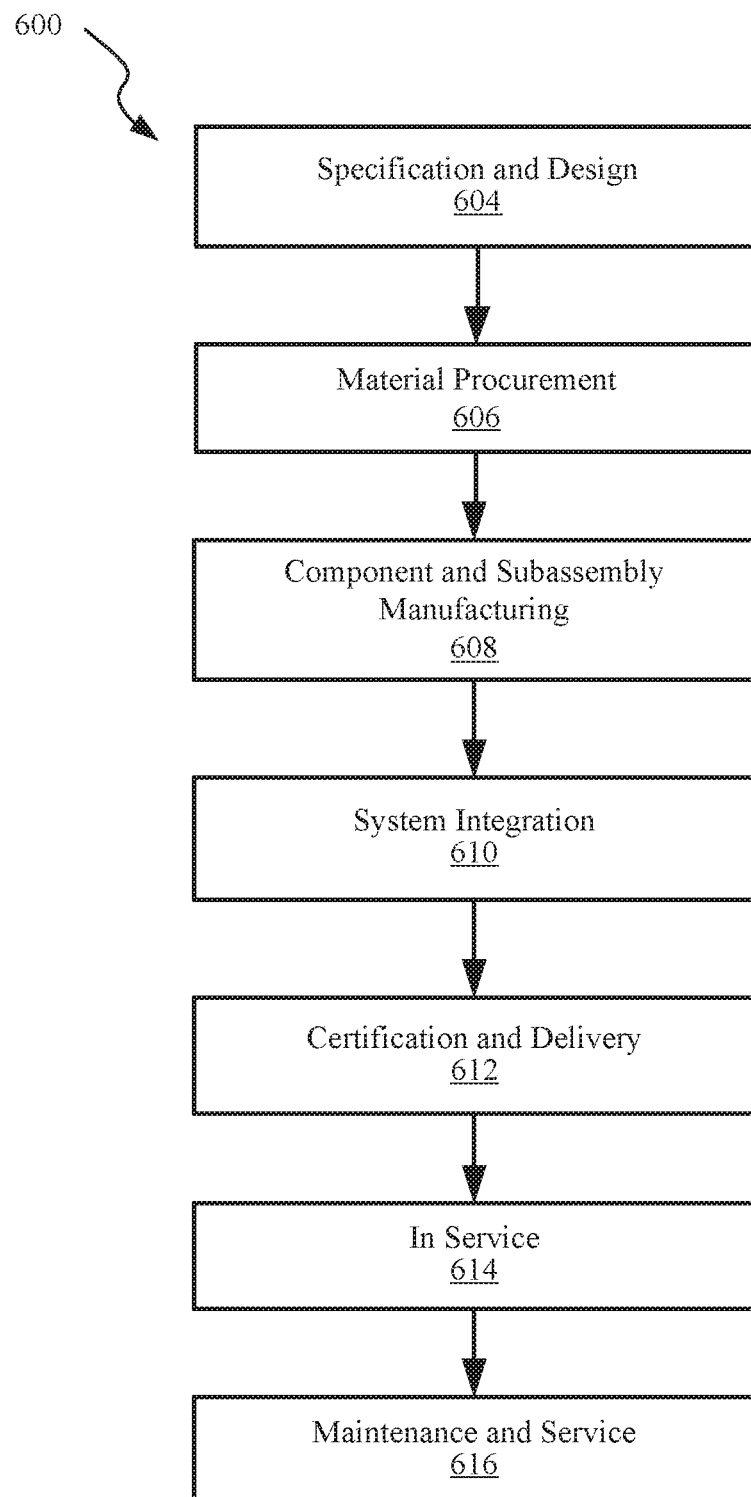
FIG. 6 is a block diagram of aircraft production and service methodology that may utilize methods and assemblies described herein.

Examples of the present disclosure may be described in the context of aircraft manufacturing and service method 600 as shown in FIG. 6 and aircraft 100 as shown in FIG. 1. During pre-production, illustrative method 600 may include specification and design (block 604) of aircraft 100 and material procurement (block 606). During production, component and subassembly manufacturing (block 608) and inspection system integration (block 610) of aircraft 100 may take place. Described apparatus and assemblies may constructed, installed, and/or programmed in any of specification and design (block 604) of aircraft 100, material procurement (block 606), component and subassembly manufacturing (block 608), and/or inspection system integration (block 610) of aircraft 100.

Thereafter, aircraft 100 may go through certification and delivery (block 612) to be placed in service (block 614). While in service, aircraft 100 may be scheduled for routine maintenance and service (block 616). Routine maintenance and service may include modification, reconfiguration, refurbishment, etc. of one or more inspection systems of aircraft 100. Described apparatus, and corresponding methods of operation, may be implemented in any of certification and delivery (block 612), service (block 614), and/or routine maintenance and service (block 616).

Each of the processes of illustrative method 600 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

As shown in FIG. 1, aircraft 100 produced by illustrative method 600 may include flight control system 110. It should be noted that flight control system 110 and flight control mechanism 200 are different components of aircraft 100. Flight control system 110 may be an electronic system positioned, for example, in a cockpit of aircraft 100. Flight control mechanism 200 may be a thrust generating mechanical device positioned, for example, on wing 102 or tail 104 of aircraft 100.

Aircraft 100 may further include a number of high-level inspection systems such as an electrical inspection system.

Any number of other inspection systems may be included. Although an aerospace example is shown, the principles disclosed herein may be applied to other industries, such as the automotive industry. Accordingly, in addition to aircraft 100, the principles disclosed herein may apply to other vehicles, e.g., land vehicles, marine vehicles, space vehicles, etc.

Apparatus(es) and method(s) shown or described herein may be employed during any one or more of the stages of manufacturing and service method (illustrative method 600). For example, components or subassemblies corresponding to component and subassembly manufacturing (block 608) may be fabricated or manufactured in a manner similar to components or subassemblies produced while aircraft 100 is in service (block 614). Also, one or more examples of the apparatus(es), method(s), or combination thereof may be utilized during production stages (block 608) and (block 610). Similarly, one or more examples of the apparatus or method realizations, or a combination thereof, may be utilized, for example and without limitation, while aircraft 100 is in service (block 614) and/or during maintenance and service (block 616).

CONCLUSION

Although the foregoing concepts have been described in some detail for purposes of clarity of understanding, after reading the above-disclosure it will be apparent that certain changes and modifications may be practiced within the scope of the appended claims. It should be noted that there are many alternative ways of implementing these processes and systems. Accordingly, the present examples are to be considered as illustrative and not restrictive.

In the above description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

What is claimed is:

1. A flight control mechanism of an aircraft, the flight control mechanism comprising:
   a center member, comprising a top edge and a bottom edge, wherein a first axis defining a centerline of the flight control mechanism is defined to run through the center member;
   a top panel, pivotable relative to the center member around a top pivot axis,
     wherein the top pivot axis is disposed above the first axis,
     wherein the top edge of the center member extends toward the top panel,
     wherein the top panel is pivotable relative to a top flush orientation of the top panel such that, in a first pivoted position, a portion of the top panel is disposed below the first axis, and
     wherein, in the top flush orientation, the top panel is coplanar with a top wing surface of the aircraft;
   a bottom panel, pivotable relative to the center member around a bottom pivot axis,
     wherein the bottom pivot axis is disposed below the first axis,
     wherein the bottom edge of the center member extends toward the bottom panel,
     wherein the bottom panel is pivotable relative to a bottom flush orientation of the bottom panel such that, in a second pivoted position, a portion of the bottom panel is disposed above the first axis, and
     wherein, in the bottom flush orientation, the bottom panel is coplanar with a bottom wing surface of the aircraft;
   a top actuator, coupled to the top panel and operable to pivot the top panel, independently from the bottom panel; and
   a bottom actuator, coupled to the bottom panel and operable to pivot the bottom panel, independently from the top panel.

2. The flight control mechanism of claim 1, wherein the center member further comprises a center edge extending between the top edge and the bottom edge of the center member.

3. The flight control mechanism of claim 2, wherein the center edge protrudes past a plane extending through the top edge and the bottom edge of the center member.

4. The flight control mechanism of claim 2, wherein the center member has a shape comprising two curved segments connected at the center edge.

5. The light control mechanism of claim 4, wherein each of the two curved segments connected at the center edge has a parabolic shape or a circular shape.

6. The flight control mechanism of claim 4, wherein the two curved segments have identical shapes.

7. The flight control mechanism of claim 4, wherein an angle between the two curved segments at the center edge is between about 1° and 25°.

8. The flight control mechanism of claim 1, wherein the top panel is configured to pivotably couple to a top wing component, and wherein the bottom panel is configured to pivotably couple to a bottom wing component.

9. The flight control mechanism of claim 1, wherein at least one of the top panel or the bottom panel is pivotably coupled to the center member.

10. The flight control mechanism of claim 1, wherein both the top panel and the bottom panel are pivotably coupled to the center member.

11. The flight control mechanism of claim 1, wherein the top panel and the bottom panel is pivotable at least 20° in one direction relative to a longitudinal axis of the flight control mechanism and at least 60° in the other direction relative to the longitudinal axis.

12. The flight control mechanism of claim 1, wherein the top actuator is coupled to the top panel using a top rod connected to a top pivot bearing of the top panel and a roller bearing extending within a linear slot.

13. The flight control mechanism of claim 1, wherein the top actuator is a linear actuator.

14. The flight control mechanism of claim 1, wherein the top actuator is a rotating actuator.

15. The flight control mechanism of claim 1, further comprising a nozzle directed at the center member.

16. The flight control mechanism of claim 15, wherein the nozzle is directed along a longitudinal axis of the flight control mechanism.

17. The flight control mechanism of claim 15, wherein the center member further comprises a center edge extending between the top edge and the bottom edge of the center member, and the center edge extends along a longitudinal axis of the flight control mechanism, and wherein the flight control mechanism further comprises a valve connected to the nozzle and operable to control flow of gas from a gas turbine engine of the aircraft to the nozzle.

18. The flight control mechanism of claim 1, wherein the top panel contacts the bottom panel in the first pivoted position and/or the bottom panel contacts the top panel in the second pivoted position.

19. A method of operating an aircraft, the method comprising:
- determining a flight speed of the aircraft, the aircraft comprising a first flight control mechanism positioned in a first wing and a second flight control mechanism positioned in a second wing;
- wherein each of the first flight control mechanism and the second flight control mechanism comprises:
  - a center member, wherein a first axis defining a centerline of the flight control mechanism is defined to run through the center member;
  - a top panel, pivotable relative to the center member, wherein the top panel is disposed above the first axis in a first resting position,
    - wherein the top panel is pivotable relative to a top flush orientation of the top panel such that, in a first pivoted position, a portion of the top panel is disposed below the first axis, and
    - wherein, in the top flush orientation, the top is coplanar with a top wing surface of the aircraft;
  - a bottom panel, pivotable relative to the center member,
    - wherein the bottom panel is disposed below the first axis in a second resting position,
    - wherein the bottom panel is pivotable relative to a bottom flush orientation of the bottom panel such that, in a second pivoted position a portion of the bottom panel is disposed above the first axis, and
    - wherein, in the bottom flush orientation, the bottom panel is coplanar with a bottom wing surface of the aircraft; and
  - a nozzle directed at the center member;
- determining a flight condition of the aircraft selected from the group consisting of a no-change condition, a lift-change condition, a roll-change condition, a drag-change condition, an aft-force condition, a forward-force condition, and a yaw-change condition;
- determining an operating condition of the nozzle of each of the first flight control mechanism and the second flight control mechanism, based on the flight speed of the aircraft and the flight condition of the aircraft;
- determining an orientation of each of the top panel and the bottom panel of each of the first flight control mechanism and the second flight control mechanism, based on the flight speed of the aircraft and the flight condition of the aircraft;
- positioning each of the top panel and the bottom panel of each of the first flight control mechanism and the second flight control mechanism according to the determined orientation; and
- operating the nozzle of each of the first flight control mechanism and the second flight control mechanism in accordance with the determined operating conditions.

20. A short takeoff and vertical landing (STOL) aircraft comprising:
- a flight control system;
- a wing;
- a tail;
- a turbine engine; and
- a flight control mechanism positioned on the wing or the tail, the flight control mechanism comprising:
  - a center member, wherein a first axis defining a centerline of the flight control mechanism is defined to run through the center member;
  - a top panel, pivotable relative to the center member based on input from the flight control system,
    - wherein the top panel is disposed above the first axis in a first resting position,
    - wherein the top panel is pivotable relative to a top flush orientation of the top panel such that, in a first pivoted position, a portion of the top panel is disposed below the first axis, and
    - wherein, in the top flush orientation, the top panel is coplanar with a top wing surface of the aircraft; and
  - a bottom panel, pivotable relative to the center member based on input from the control system,
    - wherein the bottom panel is disposed below the first axis in a second resting position,
    - wherein the bottom panel is pivotable relative to a bottom flush orientation of the bottom panel such that, in a second pivoted position, a portion of the bottom panel is disposed above the first axis, and
    - wherein, in the bottom flush orientation, the bottom panel is coplanar with a bottom win surface of the aircraft.

* * * * *